United States Patent
Kang et al.

(10) Patent No.: US 9,022,582 B2
(45) Date of Patent: May 5, 2015

(54) HIGH DYNAMIC RANGE PROJECTION SYSTEM

(75) Inventors: Michael Kang, North Vancouver (CA); Gerwin Damberg, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 568 days.

(21) Appl. No.: 13/265,677

(22) PCT Filed: Apr. 29, 2010

(86) PCT No.: PCT/US2010/032912
§ 371 (c)(1),
(2), (4) Date: Oct. 21, 2011

(87) PCT Pub. No.: WO2010/127076
PCT Pub. Date: Nov. 4, 2010

(65) Prior Publication Data
US 2012/0038693 A1    Feb. 16, 2012

Related U.S. Application Data

(60) Provisional application No. 61/174,315, filed on Apr. 30, 2009.

(51) Int. Cl.
*G03B 21/28*    (2006.01)
*H04N 9/31*    (2006.01)
(Continued)

(52) U.S. Cl.
CPC ........... *H04N 9/3197* (2013.01); *H04N 9/3117* (2013.01); *H04N 9/3126* (2013.01); *G02F1/133603* (2013.01); *G02F 1/133524* (2013.01); *G02F 1/1347* (2013.01); *G09G 3/346* (2013.01); *G09G 3/3611* (2013.01); *G09G 2300/023* (2013.01)

(58) Field of Classification Search
CPC ............ G02F 1/1347; G02F 1/133524; G02F 1/133603; G03B 21/28; G03B 21/00
USPC ........... 353/30, 31, 32, 33, 38, 69–70, 84–85, 353/98–99; 348/743–747, E9.027, E9.029, 348/E9.031; 349/5, 7–9; 345/691, 692, 213
See application file for complete search history.

(56) References Cited

U.S. PATENT DOCUMENTS 6,280,034 B1    8/2001    Brennesholtz
6,568,815 B2    5/2003    Yano
(Continued)

FOREIGN PATENT DOCUMENTS

JP    2005-250235    9/2005
WO    2006/102769    10/2006

OTHER PUBLICATIONS

Damberg, et al., "3.2:High Dynamic Range Projection Systems" SID 2007 SID International Symposium, Society for Information Display, Los Angeles, USA, vol. XXXVIII, May 20, 2007, pp. 4-6.

*Primary Examiner* — Sultan Chowdhury
(74) *Attorney, Agent, or Firm* — John W. Carpenter

(57) ABSTRACT

Embodiments relate generally to computer-based image processing, and more particularly, to systems, computer-readable media, methods, integrated circuits, and apparatuses to facilitate operation of a projection system with relatively high dynamic range output by, among other things, providing subsets of light patterns along an optical path during respective first and second temporal fields associated with respective first and second illuminants. The projection system can synthesize color for projectable images by combining or otherwise using the subsets of light patterns with an array of color elements to produce projectable images with color in at least the visible spectrum.

21 Claims, 18 Drawing Sheets

(51) Int. Cl.
  *G02F 1/1335* (2006.01)
  *G02F 1/1347* (2006.01)
  *G09G 3/34* (2006.01)
  *G09G 3/36* (2006.01)

(56) References Cited

U.S. PATENT DOCUMENTS

| | | |
|---|---|---|
| 6,631,993 B2 | 10/2003 | Fielding |
| 6,650,377 B2 | 11/2003 | Robinson et al. |
| 6,850,352 B1 | 2/2005 | Childers |
| 6,962,414 B2 | 11/2005 | Roth |
| 8,096,665 B2 * | 1/2012 | Bellis et al. ............... 353/121 |
| 8,246,177 B2 * | 8/2012 | Maeda ............... 353/99 |
| 2001/0021004 A1 * | 9/2001 | Yano ............... 353/31 |
| 2005/0185147 A1 | 8/2005 | Berman |
| 2005/0195223 A1 | 9/2005 | Nitta |
| 2007/0126992 A1 | 6/2007 | Penn |
| 2009/0096995 A1 * | 4/2009 | Malfait ............... 353/31 |

* cited by examiner

|  | FRAME 1 | | FRAME 2 |
|---|---|---|---|
|  | TEMPORAL FIELD 1 | TEMPORAL FIELD 2 | TEMPORAL FIELD 1 |
| TEMPORAL COLOR SEPARATOR | CYAN | YELLOW | CYAN |
| REAR MODULATOR 1 | GREEN | GREEN | GREEN |
| REAR MODULATOR 2 | BLUE | RED | BLUE |
| PROJECTABLE IMAGE @ FRONT MODULATOR (e.g. green/ magenta mosaic) | GREEN+BLUE | GREEN+RED | GREEN+BLUE |

FIGURE 11

| 2 SUB-PIXEL ELEMENT (e.g., MOSAIC) | 1ST ILLUMINANT/2ND ILLUMINANT | PIXEL (i.e., OF PROJECTABLE IMAGE) |
|---|---|---|
| CYAN/MAGENTA | BLUE/YELLOW | BLUE/(RED+GREEN) |
| GREEN/MAGENTA | CYAN/YELLOW | (GREEN+BLUE)/ (GREEN+RED) |
| CYAN/YELLOW | GREEN/MAGENTA | GREEN/(RED+BLUE) |
| BLUE/YELLOW | CYAN/MAGENTA | (BLUE+GREEN)/ (BLUE+RED) |
| MAGENTA/YELLOW | RED/CYAN | RED/(BLUE+GREEN) |
| RED/CYAN | MAGENTA/YELLOW | (RED+BLUE)/ (GREEN+BLUE) |

FIGURE 12

HIGH DYNAMIC RANGE PROJECTION SYSTEM

CROSS-REFERENCE TO RELATED APPLICATIONS

This application claims priority to U.S. Patent Provisional Application No. 61/174,315, filed 30 Apr. 2009, hereby incorporated by reference in its entirety.

FIELD

Embodiments of the invention relate generally to displaying images, and more particularly, to systems, apparatuses, integrated circuits, computer-readable media, and methods to operate digital projection systems that improve the dynamic range in projected imagery.

BACKGROUND

Projection devices use one set of optical structures to guide light from a light source onto an image modulator, which in turn, adjusts the intensity of incident light for each pixel. Once modulated, the light is projected from another set of imaging optical structures onto a surface, such as a screen. One drawback of such projection devices is that they typically project images with a relatively low dynamic range of output luminance as compared to, for example, the dynamic range of analog film. Other drawbacks of conventional projection devices relate to techniques and structures for synthesizing color. For example, some typical projection devices use three modulators to combine individual images concurrently in each of the three primary colors. As another example, some traditional projection devices implement three temporal fields using, for instance, a single modulator.

Furthermore, some conventional projection devices determine color output images using full color pixels each with individually addressable sub-pixels to produce any color in a color space (e.g., the RGB color space). For example, three sub-pixels are usually used to form a full color pixel, such as three sub-pixels that correspond to red, green and blue. The implementation of three individually addressable sub-pixels to form color images typically requires additional resources and manufacturing costs, such as components and drive electronics that control each of the three sub-pixel elements.

Additionally, some conventional three sub-pixel configurations have other drawbacks. In one example, displaying a blue image would utilize the blue sub-pixel for color control, while the red and green sub-pixels would be in an "off" state, namely idle. Thus, the luminance from each of the red and green sub-pixels does not generally contribute to the brightness of the output image.

In view of the foregoing, it would be desirable to provide systems, apparatuses, integrated circuits, computer-readable media, and methods to operate projection devices with improved effective high dynamic range for output images.

SUMMARY

Embodiments relate generally to computer-based image processing, and more particularly, to systems, computer-readable media, methods, integrated circuits, and apparatuses to facilitate operation of a projection system with a relatively high dynamic range by, for example, providing subsets of light patterns along an optical path during respective first and second temporal fields associated with respective first and second illuminants. The projection system can synthesize color for projectable images by combining or otherwise using the subsets of light patterns with an array of color elements to produce projectable images with color in at least the visible spectrum. Each color element can be configured to modify (e.g., by filtering) the color of the light patterns to produce the projectable image. In at least some embodiments, the projection system can synthesize color for the projectable image by temporally and spatially filtering combinations from the subsets of light patterns. In some embodiments, the projectable image may be generated with an enhanced contrast ratio, corresponding to an enhanced range of brightness levels. Additionally, the first and second illuminants can be used to generate the projectable image with a visible light spectrum, including primary colors.

BRIEF DESCRIPTION OF THE FIGURES

The invention and its various embodiments are more fully appreciated in connection with the following detailed description taken in conjunction with the accompanying drawings, in which:

FIG. 11 illustrates a chart of an example of hybrid color synthesis, according to at least some embodiments of the invention.

FIG. 12 illustrates a table of exemplary hybrid color synthesis combinations by way of example, according to various embodiments.

Like reference numerals refer to corresponding parts throughout the several views of the drawings. Note that most

DETAILED DESCRIPTION

Figure 1:
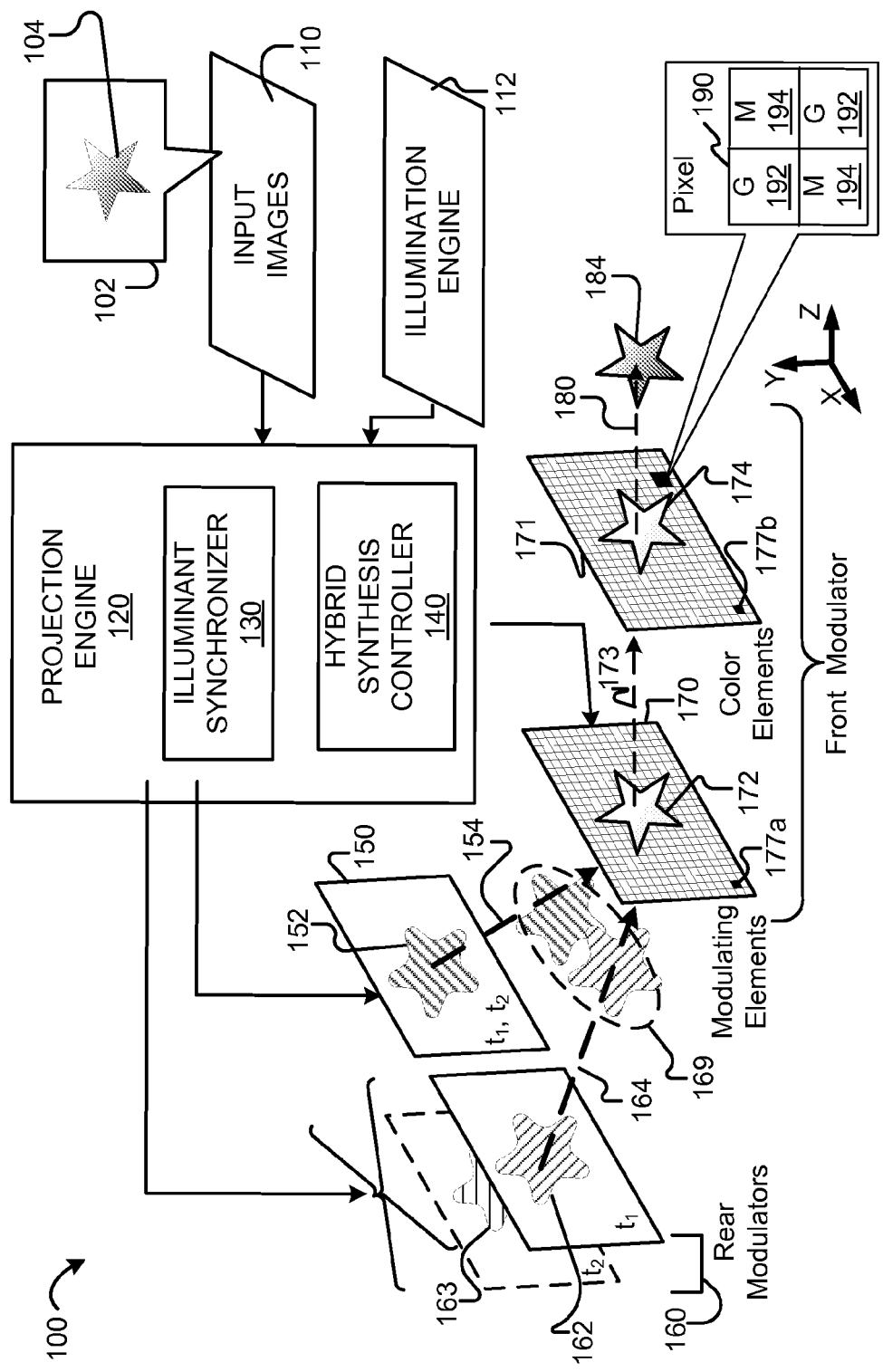
FIG. 1 is a diagram illustrating an example of operating a high dynamic range projection system, according to at least some embodiments of the invention.

FIG. 1 is a diagram illustrating an example of operating a high dynamic range projection system, according to at least some embodiments of the invention. As shown, system 100 includes a projection engine 120 with an illuminant synchronizer 130 and a hybrid synthesis controller 140, both of which are configured to control operation of components 150, 160, 170 and 171. Projection engine 120 can be configured to control components 150, 160, and 170 as a function of input images 110 to generate projectable images 180. For example, components 150 and 160 transmit light patterns 152, 162, 163 representing low resolution versions of input images 110 (e.g., input image 104) along optical paths 154 and 164, and superimpose the light patterns 169 onto a surface of component 170. Component 170 can be configured to use the superimposed light patterns 169 to generate a high resolution sub-image 172 of the input image 104 depicted in callout 102. Component 171 can be configured to modify the light on path 173 associated with modulating the high resolution sub-image 172 with superimposed light patterns 169 to produce a projectable image 180 with a visible light spectrum (e.g., all or most of the wavelengths of visible light) including primary colors, and with an enhanced dynamic range of luminance. In an example, projectable image 184 is a high dynamic range projectable image of input image 104. In some embodiments, components 150 and 160 constitute rear modulators and components 170 and 171 constitute a front modulator.

In some examples, projection engine 120 receives multiple illuminants, such as two, each of which corresponds to a different spectral power distribution, and is associated with a range of wavelengths. In other examples, an illumination engine 112 is configured to generate a light spectrum, which is received by projection engine 120. In turn, projection engine 120 is configured to generate multiple illuminants, such as two illuminants, each of which is generated during a period of time (e.g., interval of time) corresponding to a temporal field. In such examples, illuminant synchronizer 130 switches between the generation of the two illuminants over two respective temporal fields. In the example shown, a first temporal field is designated as "$t_1$" and a second temporal field is designated as "$t_2$." Each illuminant (not shown) can correspond to a certain spectral power distribution, the combination of which is used by the projection engine 120 to generate the projectable images 180 with a visible light spectrum, including primary colors. During a first temporal field (e.g., interval of time), $t_1$, components 150 and 160 generate a first subset of light patterns that include light pattern 152 and light pattern 162, each representing low resolution versions of input image 104 according to the first illuminant, which can be composed of, for example, cyan-colored light. During a second temporal field (e.g., interval of time), $t_2$, components 150 and 160 generate a second subset of light patterns that include light pattern 152 and light pattern 163, each representing low resolution versions of input image 104 according to the second illuminant, which can be composed of, for example, yellow-colored light. Note that the terms "sub-image" may include part or a portion of an input image, or a reproduction thereof, that, in combination with other sub-images (e.g., either spatially or temporally, or both), can constitute an image, such as output image 184. A sub-image can either be of low resolution (i.e., "low resolution sub-image") in association with components 150 and 160, or of high resolution (i.e., "a high resolution sub-image") in association with, for example, component 170. Further, note that a low-resolution sub-image may be formed as "light patterns" and/or "light fields," and may be referred to interchangeably as "light pattern" and/or "light fields."

Hybrid synthesis controller 140 can be configured to control components 150 and 160 to coordinate the generation of the first and second subsets of light patterns, and to control modulation elements of component 170. In operation, hybrid synthesis controller 140 controls components 150 and 160 to generate a low resolution backlight illuminant(s) (i.e., one or more optically blurred light fields) that illuminate component 170, which includes modulating elements that generate a high-resolution sub-image 172. Hybrid synthesis controller 140 determines transmission values to be generated at component 170, whereby the transmission values compensate for, and, thus, correct for the optical blur. Optical multiplication of the backlight illumination and the image transmission values for controlling component 170 generates output image 184. In some embodiments, component 170 includes modulating elements that are each configured to modulate the intensity of light (e.g., backlight) incident on a modulating element, which, in turn, transfers the modulated light to a corresponding color element in component 171 to modify the color of the modulated light. For example, modulating element 177a corresponds with color element 177b. As used herein, the term "sub-pixel" can refer to, at least in some embodiments, to an individually-addressable modulating element that can correspond to a color element. In some embodiments, a sub-pixel can refer to the smallest unit of information in an image for which an associated intensity can be modulated. In at least some embodiments, a group of modulating elements (e.g., a group of sub-pixels) correspond with a group of color elements, the combined functionality of which provides for a pixel that can provide full color (e.g., a pixel that provides for the spatial combination of colors produced by sub-pixels in the X and Y plane, and light in the Z-direction, to produce colors based on the primary colors). As used herein, the term "pixel" can refer to, at least in some embodiments, to a portion of an image, and can include a group of sub-pixels, each of which constitutes a part of the portion of the image. For example, pixel 190 includes sub-pixels 192 and 194, with sub-pixels 192 being configured to include green ("G") color elements (or color filters) and sub-pixels 194 being configured to include magenta ("M") color elements. As used herein, the term "modulating element" can correspond to, at least in some embodiments, either an individually-addressable sub-pixel or an individually-addressable pixel, and, in some cases, the term "sub-pixel" can be used interchangeably with the term "pixel." For example, there are instances in which the term "pixel" can be used to describe a smallest unit of information (rather than the sub-pixel) for which an associated intensity can be modulated. As used herein, the term "pixel mosaic" can refer to, at least in some embodiments, a group of color filters corresponds to a group of modulating elements. For example, a pixel mosaic of color filters can correspond to sub-pixels that constitute a pixel. In some embodiments, the positions of components 171 and 170 can be interchanged such that color elements in components 171 receive backlight and transmit light to modulating elements in component 170, which, in turn, generates output image 184.

Components 150 and 160 can operate to illuminate component 170, and to superimpose the light patterns onto component 170. To illustrate, consider that during a first temporal field, $t_1$, light patterns 152 and 162 combine at component 170 to form a first superimposed sub-image (of light patterns) 169 whereas during a second temporal field, $t_2$, light patterns 152 and 163 combine at component 170 to form a second superimposed sub-image (not shown). In various embodiments, the first and second superimposed sub-images (e.g., the set of temporally synthesized images) that illuminate the surface of component 170 temporally combine (e.g., to synthesize color) during a frame composed of temporal fields $t_1$ and $t_2$. Hybrid synthesis controller 140 can be further configured to coordinate the spatial color synthesis of the temporally-generated subsets of light patterns with high resolution aspects of the input image at components 170 and 171. In some embodiments, a high resolution sub-image 172 of the input image 104 is generated at component 170, with the high resolution sub-image 172 being derived by spatially combining a set of temporally synthesized images, such as superimposed sub-images 169 (e.g., as low resolution sub-images), during a first temporal field, to form a light field on path 173 that is transmitted to a surface on component 171 to produce an illuminated sub-image 174. During a second temporal field, the high resolution sub-image 172 is derived by spatially combining a set of temporally synthesized images, such as superimposed sub-images 152 and 163 (e.g., as low resolution sub-images) to form another light field on path 173, which, in turn, is transmitted to a surface on component 171 to produce an illuminated sub-image 174. In at least some embodiments, component 171 is an array of color elements that provides additional details derived from the input image to form the projectable image, and high resolution sub-image 172 is formed by controlling a number of pixels (or any other unit of division, such as sub-pixels), where a pixel 190 corresponds to one or more color elements 192 and 194. According to some embodiments, a pixel 190 can be configured to cause the color elements to spatially modify the light field on path 173 with respect to color to produce projectable images 180 having a high dynamic range contrast ratio with a visible light spectrum including primary colors over the first and second temporal fields. In some examples, the array of color elements is configured to modify one or more ranges of wavelengths in a visible light spectrum during one or more time intervals.

In view of the foregoing, components 150 and 160 constitute rear modulators of system 100. The two rear modulators produce the first and second subsets of light patterns at low resolution (i.e., reduced spatial resolution) and with a first contrast ratio being low. Thus, rear modulators of low spatial resolution and of low contrast ratios (i.e., reduced contrast ratios), including monochrome modulators, may be utilized, according to some embodiments, thereby achieving manufacturing cost savings of a projection system. In at least some instances, lower resolution modulators are relatively less expensive as higher resolution modulators. In the example shown, component 170 corresponds to a front modulator as a constituent of system 100. The front modulator produces a higher resolution sub-image (i.e., higher spatial resolution than that of the rear modulators) during a frame based on information derived from the input image (e.g., information for modulating the modulating elements) that may not have been included in the first and second subsets of sub-images. A front modulator can produce a high resolution sub-image having a luminance with relatively higher contrast ratio than a contrast ratio associated with the first and second subsets of light patterns. In at least some embodiments, spatial temporal color synthesis based on (1.) the first and second subsets of light patterns from the rear modulators and on (2.) the high resolution sub-image generated by the front modulator yields an effective dynamic range of the projectable image 180. Image 180 is the multiplicative-combination (i.e., product) of a contrast ratio associated with the first and second subsets of light patterns and a contrast ratio associated with the high resolution sub-image, whereby the projectable image has a dynamic range that exceeds each of the individual contrast ratios. While the front modulator produces a higher contrast than the rear modulators, according to some embodiments, this need not be the case. In other embodiments, the front modulator produces the same or a lower contrast than the rear modulators. In various embodiments, any of one or more rear modulators can have a lower or equivalent resolutions as any of one or more front modulators.

In some examples, system 100 operates upon two illuminants. In other examples, system 100 generates two illuminants to illuminate the rear modulators represented by components 150 and 160. Accordingly, three primary colors need not be produced individually by filters, for example, to produce a projectable image with visible light spectrum including at least primary colors. As such, manufacturing costs may be reduced with the use of two illuminants in combination with the three dimensional color synthesis techniques described herein. According to some embodiments, a lower luminance difference between the two illuminants has a lower magnitude than a luminance difference between a brightest channel (e.g., green) and a dimmest channel (e.g., blue) of the three primary colors. Accordingly, the lower luminance difference between two illuminants for two temporal fields can mitigate artifacts, reduce or eliminate flicker, and/or and can reduce color break-up. Thus, a projectable image can be produced with a relatively smoother luminance intensity distribution. In some embodiments, component 171 includes an array of color elements having a plurality of two sub-pixel elements; while in other embodiments, component 171 includes one or more filters.

In some examples, a two sub-pixel element (i.e., two types of color elements) can include: one or more sub-pixel green filters to pass green light; and, one or more sub-pixel magenta filters to pass magenta light (e.g., blue and red). Primary colors can be derived from the use of the sub-pixel green filters and the sub-pixel magenta filters. A reduction in the quantity of sub-pixels from three sub-pixels (e.g., one sub-pixel for each of red, green and blue) per pixel to two (e.g., one sub-pixel for each of magenta and green) per pixel reduces a number of components (e.g., such as two drivers rather than three) used to control each pixel, thereby enhancing the transmission of light (i.e., the transmission efficiency) that might otherwise be absorbed (or blocked) by the liquid crystal drive electronics, at least in some cases. For example, a liquid crystal display front modulator having 1920×1080×2 pixels may require less drive electronics for a two sub-pixel element rather than for a three sub-pixel element (i.e., 1920×1080×3 pixels). In some embodiments, fewer components that control the sub-pixels decreases the area that otherwise might include such components, thereby increasing the fill factor (i.e., increasing an amount of area for active generation of light for a portion of an image relative to the amount of area that includes inactive area or non-light generating space, such as between the active area that typically includes the drive electronics). In at least one embodiment, a reduction in components and an increase in the fill factor facilitates an increase in the resolution of a display area. In some embodiments, two types of sub-pixels (e.g., 2 sub-pixels associated with one color, and 2 sub-pixels associated with another color) can be used to form one color pixel (e.g., a pixel configured to generate light having any color).

With the description provided herein, acquiring, processing and producing projectable images may be accomplished in a manner that provides a dynamic range with enhanced contrast ratio.

In some embodiments, paths 154 and 164 coincide with the same optical path, and, further, coincide with path 173, as well as path 180. In some embodiments, components 150 and 160 modify incident light to either transmit or reflect a low resolution sub-image (e.g., light pattern, light field), representing the input image 104, using the incident light, which can be an illuminant. In some embodiments, one illuminant is cyan-colored light and another illuminant is yellow-colored light. Projection engine 120 can include spectral-optical structures (not shown) for generating primary colors (e.g., red, blue, or green) from cyan and yellow-colored lights to produce light patterns in red, blue, or green. In one example, projection engine 120 generates light pattern 152 using predominantly green light and light pattern 162 using predominantly blue light during temporal field $t_1$, whereas projection engine 120 generates light pattern 152 using predominantly green light and light pattern 163 using predominantly red light during temporal field $t_2$. Thus, in temporal field $t_1$, superimposed light patterns 169 (i.e., of sub-images 152 and 162) illuminate component 170 with cyan light, whereas, in temporal field $t_2$, superimposed light patterns derived from sub-images 152 and 163 illuminate component 170 with yellow light. Component 170 can be configured to convert the cyan and yellow-colored low resolutions sub-images into cyan and yellow-colored higher resolution images, which, in turn, can be filtered by component 171 to produce a projectable image 180. Note that in some embodiments, projection engine 120 excludes spectral-optical structures for generating primary colors (e.g., red, blue, or green) from cyan and yellow-colored lights to produce light patterns in red, blue, or green.

In some examples, projection engine 120 generates light pattern 152 using predominantly cyan light during temporal field $t_1$, whereas projection engine 120 generates light pattern 162 using predominantly yellow light during temporal field $t_2$. In such examples, light pattern 163 need not be generated. Therefore, in one frame of temporal fields $t_1$ and $t_2$, superimposed light patterns 152 and 162 can be converted by component 170 into higher resolution images, which in turn, can be filtered by component 171 to produce projectable images 180. In other examples, projection engine 120 generate light pattern 152 using predominantly cyan light and light pattern 162 using predominantly yellow light during the same temporal field, commensurate with appropriate design implementations and components. In such examples, light pattern 163 need not be generated.

In alternate embodiments, system 100 includes another set of components 170' and 171' (not shown) that are arranged in parallel to components 170 and 171 to generate output image 180. In this example, one of light fields 154 and 164 is configured to be incident on component 170, whereas the other of light fields 154 and 164 is configured to be incident on component 170' (not shown). Thus, one light field is passed along from component 170 (e.g., a first array of modulating elements) to component 171 (e.g., a first array of color elements), and the other light field is passed along from component 170' (e.g., a second array of modulating elements) to component 171' (e.g., a second array of color elements). Generally, system 100 superimposes the resultant images (i.e., high resolution sub-images) from components 171 and 171' to generate projectable image 180. In at least one embodiment, each of the arrays of color elements is one type of color filter (e.g., one array of color elements can include green color elements, and the other array of color elements can include magenta color elements), rather than implementing pixel mosaics (e.g., two-types of color elements). This can enable the modulating elements to be monochrome, thereby improving transmission efficiency, according to some embodiments, which, in turn, can provide for a high dynamic range system 100 with relatively high efficiency to be produced with fewer modulators (e.g., fewer than three modulators, such as fewer than three rear modulators). In a specific embodiment, system 100 can include component 170' arranged in parallel to component 170, whereby components 170' and 170—as front modulators—are configured to share a component 171—a common array of color elements—to generate projectable image 180.

Figure 2A:
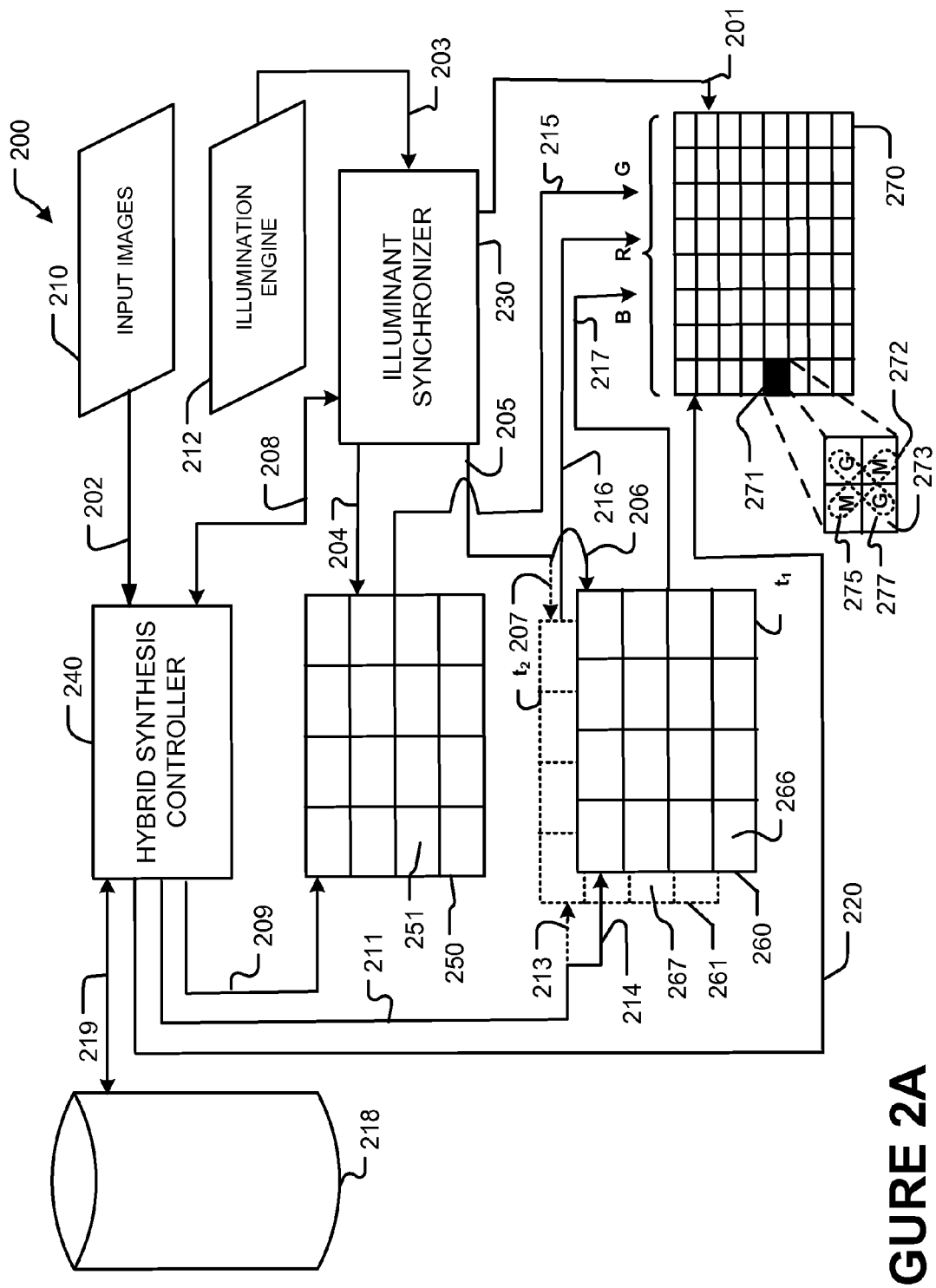
FIGS. 2A-2B illustrate functional block diagrams representing examples of operating a high dynamic range projection system with two rear modulators and a front modulator, according to at least some embodiments of the invention.
Figure 2B:
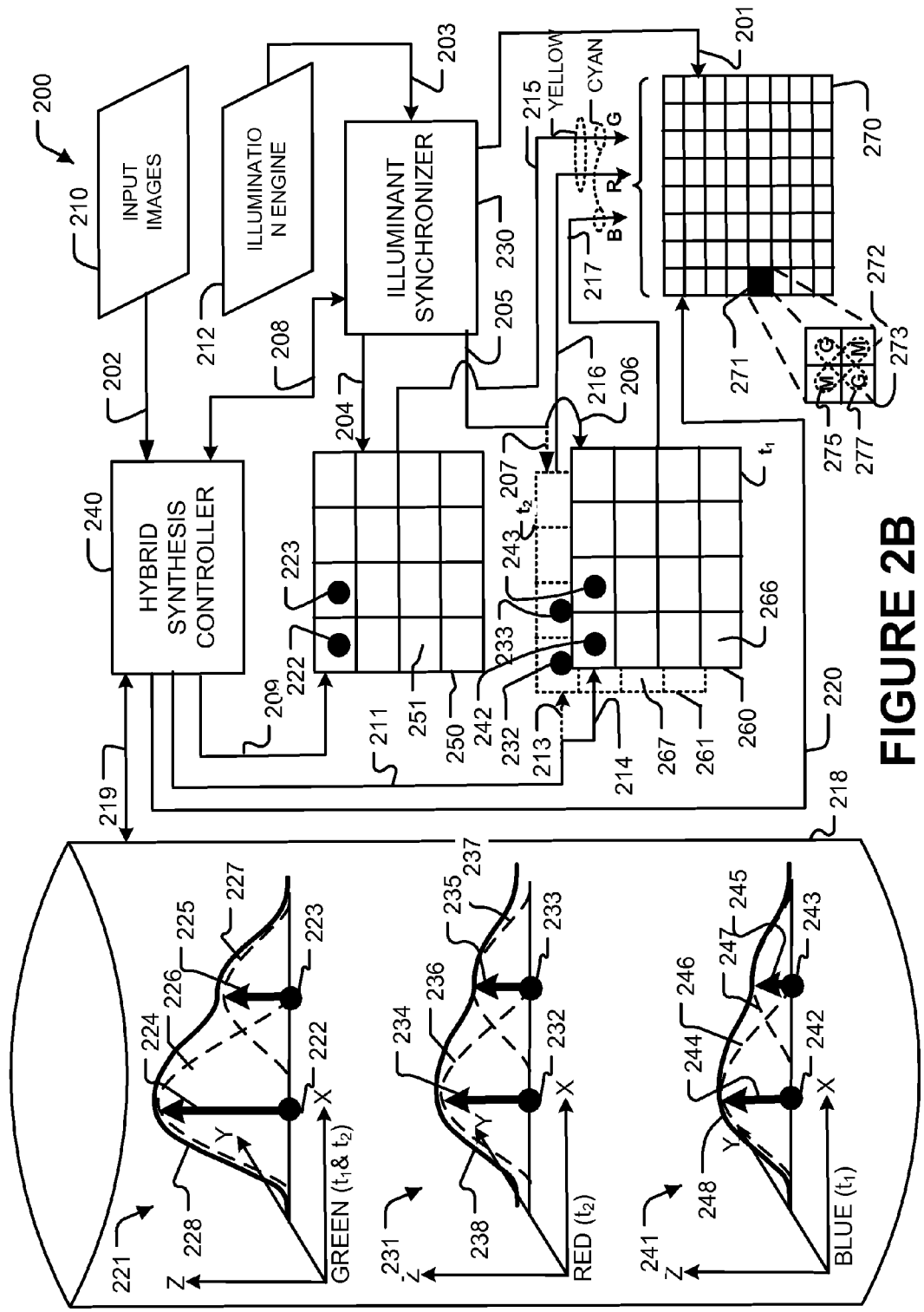

FIGS. 2A-2B illustrate functional block diagrams representing examples of operating a high dynamic range projection system with two rear modulators and a front modulator, according to at least some embodiments of the invention. FIG. 2A depicts an exemplary projection system 200 that can include an illuminant synchronizer 230, a hybrid synthesis controller 240, two rear modulators 250 and 260, a front modulator 270, and a database 218. Illuminant synchronizer 230 can be configured to receive a light spectrum along path 203 from illumination engine 212. In some examples, illuminant synchronizer 230 may further function to detect the presence of a source of light during operation of a projection system. Hybrid synthesis controller 240 is coupled to illuminant synchronizer 230 via path 208 and can be configured to receive data representing input images 210 via path 202.

Rear modulators 250 and 260 can include a group of modulating elements 251 and 266, respectively. In some embodiments, modulation elements 251 and 261 can have structures and/or functions that are similar to each other. Rear modulator 250 is coupled via path 204 to illuminant synchronizer 230, and is coupled via path 209 to hybrid synthesis controller 240. Rear modulator 260 is coupled via path 205 to illuminant synchronizer 230, and can be coupled via path 211 to hybrid synthesis controller 240. During a first temporal field, $t_1$, rear modulators 250 and 260 can be supplied with a first illuminant, from a temporal color separator in some examples, and during a second temporal field, $t_2$, rear modulators 250 and 260 can be supplied with a second illuminant. During second temporal field, $t_2$, rear modulator 260 is designated as rear modulator 261 for ease of following the description, and can include modulating elements 267. During the first temporal field, $t_1$, illuminant synchronizer 230 can provide control signals to rear modulator 260 via a path including path segment 205 and path segment 206. To indicate the second temporal field, $t_2$, illuminant synchronizer 230 can provide control signals to rear modulator 261 via a path including path segment 205 and path segment 207. As such, path segments 207 and rear modulator 261 are merely illustrative. Similarly, path segment 213 is also illustrative of path 211 carrying different signals during the second temporal field to control rear modulator 260. Note that in some embodiments, the spatial resolution of rear modulators 250, 260 (261 during $t_2$) with modulating elements 251, 266 and 267 may correspond to a portion (e.g., a non-overlapping group of pixels) of the plurality of pixels (e.g., one or more of pixel 271) at front modulator 270. According to some embodiments, rear modulators 250, 260 (261 during $t_2$) may produce a relatively blurry representation (i.e., sub-image) of the input image, that is, without high spatial frequency information in the content of input images, whereas front modulator 270 may produce a higher resolution representation of the input image.

Still referring to FIG. 2A, database 218 is coupled via path 219 to hybrid synthesis controller 240, which, in turn, is coupled via path 220 to front modulator 270. Front modulator 270 is coupled via path 201 to illuminant synchronizer 230. During the first temporal field, the two rear modulators 250 and 260 are configured to produce a subset of low resolution sub-images (interchangeably referred to as "light patterns")

that are directed via paths 215 and 217 to illuminate front modulator 270. During the second temporal field, the two rear modulators 250 and 260 are configured to produce another subset of low resolution sub-images (interchangeably referred to as "light patterns") that can be directed via paths 215 and 216 to illuminate modulator 270. Front modulator 270 can include a plurality of pixels 271, and can include a filter with a plurality of color elements 272. Color element 272 can include two sub-pixel elements, such as sub-pixel element 275 and sub-pixel element 277, either or both of which may provide for color synthesis control in some examples. In other examples, each of the 4 sub-pixels 273 is individually controlled to provide color synthesis control of pixel 271. In such examples, to effectuate individual control of sub-pixels 273, front modulator 270 includes corresponding sub-pixels (not shown) that are configurable to transmit a portion of the light patterns through corresponding color filters 272 and sub-pixels 273, 275, 277, or some combination of such. In yet further examples, sub-pixel elements 275 and 277 may be referred to interchangeably as first and second subsets of sub-pixel color filters. While magenta (M) and green (G) can be used for sub-pixel elements 275 and 277, respectively, other pairs of colors for color element 272 are possible, as indicated in the first column of the table of FIG. 12, which illustrates, by way of examples, a table of exemplary hybrid color synthesis combinations.

For example, and referring to FIG. 2B, paths 215 and 216 indicate that red and green low resolution sub-images impinging on front modulator 270 may be perceived as yellow-colored light during temporal field, $t_2$, and when passed through the magenta/green sub-pixels, referring to FIG. 11, results in red and green output sub-pixels. Further to such example, FIG. 2B also shows that paths 215 and 217 indicate green and blue low resolution sub-images impinging on front modulator 270 may be perceived as cyan-colored light during temporal field, $t_2$, and when passed through the magenta/green sub-pixels, referring to FIG. 11, results in blue and green output sub-pixels.

FIG. 2B depicts data or types of data that are used to generate low resolution sub-images, according to some embodiments. In some examples, the rear modulators 250 and 260, respectively illustrate a first subset of low resolution sub-images for a first temporal field, $t_1$. During the first temporal field, $t_1$, a first illuminant is used to generate a portion 222 of a green low resolution sub-image that corresponds to graph 221. Portion 222 is represented by a luminance impulse 224 of green-colored light and corresponds to a spatial distribution of luminance intensity 226 based on a point spread function (or light spread function). Similarly, portion 223 of the green low resolution sub-image also corresponds to graph 221, where portion 223 is depicted as luminance impulse 225 of green-colored light and can correspond to a spatial distribution of luminance intensity 227 based on a point spread function. The spatial distribution of luminance intensities 226 and 227 can be added to determine a green spatial distribution of luminance intensity 228, and may correspond to the degree of optical blur that can be measured or accounted for in image processing techniques for controlling low resolution modulating elements (e.g., 251), which can then be expressed in corresponding pixels 271 of the front modulator having a higher spatial resolution. In at least some embodiments, hybrid synthesis controller 240 can control modulating elements 251 of rear modulator 250 responsive to the luminance values associated with green spatial distribution of luminance intensities 228. Since FIG. 2B shows portion 223 having a lower magnitude of luminance of green light than portion 222, hybrid synthesis controller 240 can control the modulating elements 251 to vary the brightness of green light field emanating from the modulator 250 accordingly. Also during the first temporal field, $t_1$, portions 242 and 243 are represented as luminance impulses 244 and 245 of blue-colored light in graph 241, and can correspond to respective spatial distributions of luminance intensities 246 and 247 based on point spread functions. Blue spatial distribution of luminance intensity 248 can be determined based upon the distributions 246 and 247, and can be used to control the modulating elements 266 corresponding to portions 242 and 243 (e.g., to vary the luminance of the blue light being transmitted or reflected from the modulating elements 266).

During a second temporal field, $t_2$, and with a second illuminant, portions 222 and 223 of green low resolution sub-image can correspond to graph 221 as similarly described for the first temporal field. However, during the second temporal field, $t_2$, portions 232 and 233 of a red low resolution sub-image can be represented by luminance impulses 234 and 235, respectively, of red-colored light in graph 231. A point spread function can be applied to luminance impulses 234 and 235 to produce spatial distributions of luminance intensity 236 and 237, the spatial distribution of both being a distribution of luminance intensity 238, which may be generated by modulating elements 267 that correspond to portions 232 and 233.

Figure 13:
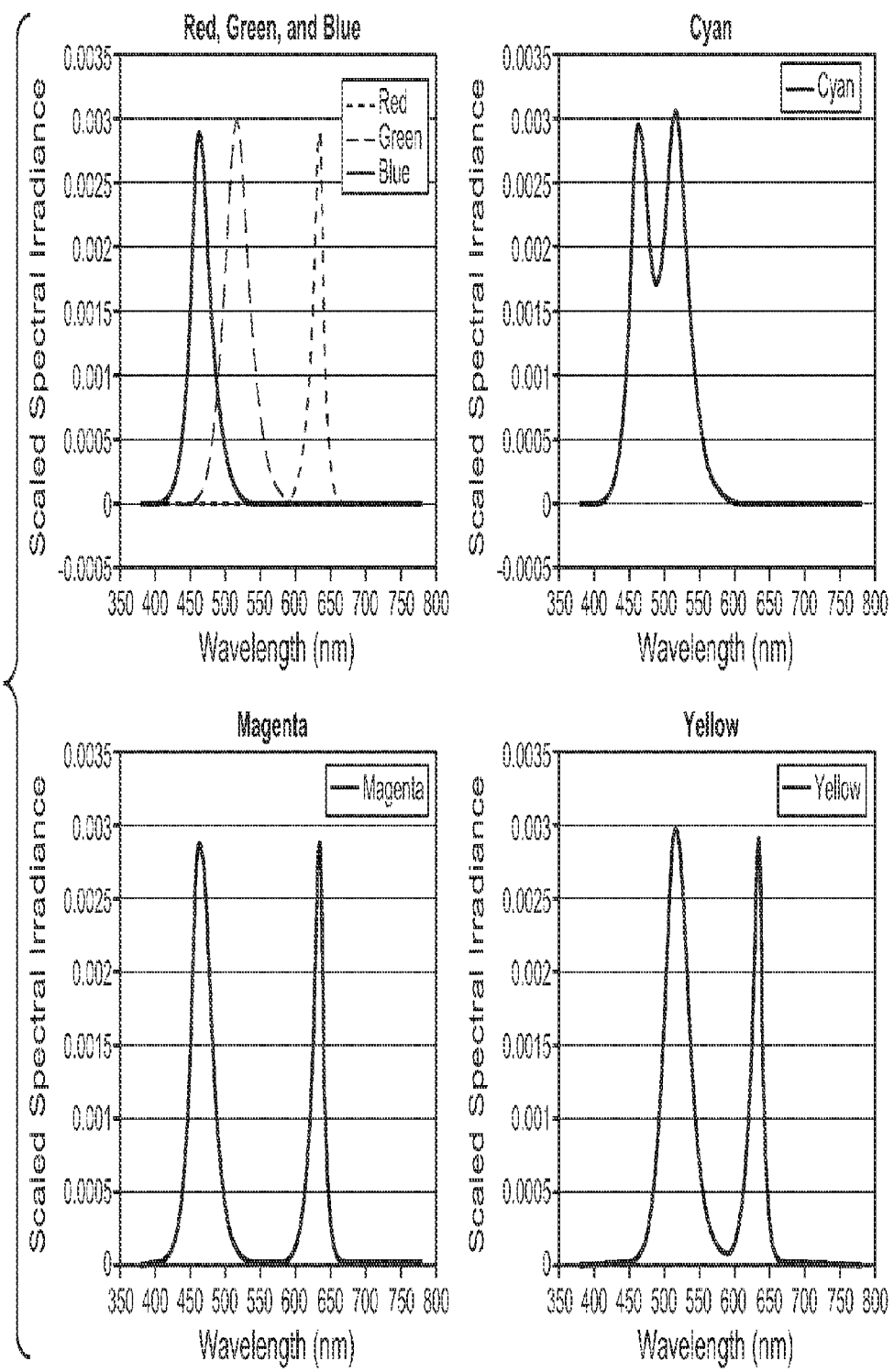
FIG. 13 illustrates examples of spectra distributions, according to at least some embodiments of the invention.

Referring to FIG. 13, examples of spectra distributions are shown, according to at least some embodiments of the invention. FIG. 13 depicts certain subsets of ranges of wavelengths in a visible light spectrum that are derived from the combination of color spectra components, such as red, green and blue. In some examples, cyan, magenta and yellow are shown to have different subsets of ranges of wavelengths of R, G, and B visible spectra. In other examples, there may be other subsets of ranges of wavelengths of different visible spectra. Over the first and second temporal fields, the modulating elements 251, 266 and 267 are configured to receive a respective range of the wavelengths in a visible light spectrum that correspond to the illuminant being supplied.

Referring back to FIG. 2B, the point spread functions described with respect to the rear modulators 250 and 260 may describe the spatial spread of an intensity profile of a pixel that is optically blurred and allows for a mathematical prediction of what low resolution sub-image may result from the rear modulators when such sub-image is optically blurred by the projection system. In some examples, the mathematical prediction may allow for an accurate simulation of the spatial light spread inherent to a particular projection system, thereby enabling a pipeline of rear modulation followed by front modulation to appropriately combine respective sub-images to produce a projectable image with high dynamic range contrast ratio. Note that other parameters about the rear and front modulators may be considered for different design implementations and for which an optical blur is determined and for which blur correction techniques are applied. In some examples, such parameters may include, but are not limited to, the distance of the optical path between the rear modulators and the front modulator, a division of the desired output image by a blurred image at the rear modulators, as well as, a compensation mask to be displayed on the front modulator at a high spatial resolution. Still in further examples, techniques to analyze a compensation image for saturated regions in which the corresponding drive values on the rear modulators may then be locally enhanced to emit sufficient light fields, may also be considered, as appropriate with modeling parameters that may be implemented at the rear modulators to mitigate the effects of artifacts to be smaller than a veiling luminance introduced by scatter and adaptation techniques associated with a human visual system.

In FIGS. 2A-2B, hybrid color synthesis may incorporate color synthesis techniques achieved through the temporal and spatial mixing of primary colors, in some embodiments, to achieve a certain perceptual experience for the viewer of the projectable images, and as intended by the content of the input images. Color synthesis is based on a human visual system that has limited spatial and temporal resolution processing capability. For example, imperfections in the media of the human eye may cause light to scatter within the eye and to form a veiling luminance on the retina, which reduces the ability to perceive certain contrast. Thus, the human eye may not be able to integrate and perceive resolutions beyond a certain threshold. The human visual system can be modeled and implemented in hardware or software, or a combination thereof. In such an example, the color elements 272 and corresponding sub-pixels 273 are controlled either individually or as a subset of sub-pixels to effectuate additive color mixing techniques for using sub-images described herein to enable the projectable image to be perceived with a uniform field of color that is a combination of colors that when mixed (e.g., combined spatially) may be perceived as an intended uniform color. Furthermore in such example, the sequential and successive imaging of modulated sub-images described herein in combination with the additive color mixing techniques may produce projectable images that are perceived with a temporally uniform field of color. In at least some embodiments, hybrid color synthesis further includes three dimensional color synthesis techniques described herein, where a combination of light fields is used to create illuminants that can reduce the number of temporal fields and the number of spatially addressable sub-pixels to produce projectable images with high dynamic range contrast ratios.

Figure 3:
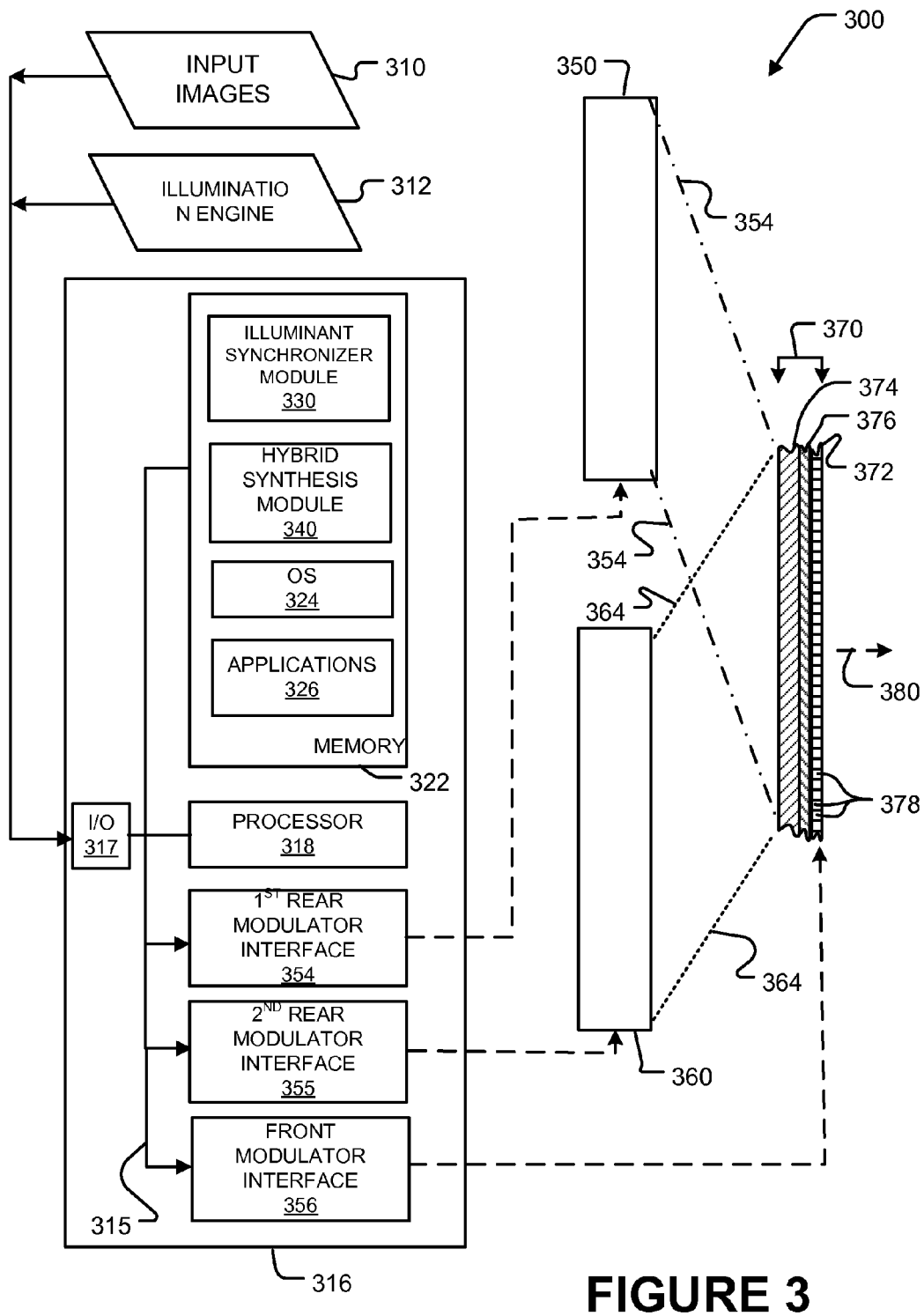
FIG. 3 is a schematic diagram illustrating a controller configured to operate a high dynamic range projection system, according to at least some embodiments of the invention.

FIG. 3 is a schematic diagram illustrating a controller configured to operate a high dynamic range projection system, according to at least some embodiments of the invention. Here, projection system 300 can include a controller 316 coupled to two rear modulators 350 and 360, and to a front modulator 370. Controller 316 can include a processor 318, a memory 322, a first rear modulator interface 354 configured to control rear modulator 350, a second rear modulator interface 355 configured to control rear modulator 360, a front modulator interface 356 configured to control front modulator 370, and an input/output (I/O) module 317 configured to receive input images 310 and illuminant information from illumination engine 312. Bus 315 couples these modules and components of controller 316 to each other, as illustrated. Processor 318 is configured to receive input images 310 from which the projectable images 380 is derived and emitted by front modulator 370. In some examples, input images 310 are gamma-encoded video signals (e.g., video stream), from which image pixels are derived. Memory 322 can include an illuminant synchronizer module 330, a hybrid synthesis module 340, an operating system 324, and ancillary applications 326 used to facilitate operation of controller 316, as well as more or fewer modules than shown. In some examples, illumination engine 312 may cause generation of a plurality of illuminants, and for which controller 316 may detect and/or coordinate with when outputting projectable images 380.

In some examples, front modulator 370 is an optical filter of programmable transparency that adjusts the transmissivity of the intensity of light incident upon it from the two rear modulators 350, 360. Front modulator 370 may include: optical structures 374 configured to carry light from rear modulators 350 and 360 to a liquid crystal layer 376; and, a filter 372 having a plurality of two sub-pixel elements 378. Dashed lines 354 and dotted lines 364 indicate that a subset of (low resolution) sub-images generated on respective rear modulators 350 and 360 are configured to illuminate front modulator 370.

Referring to FIGS. 2A-3, and based on the content of input images 310, controller 316 is configured to provide via interfaces 354-355 rear modulator drive signals to control modulating elements (e.g., 251, 266, 267 of FIGS. 2A-B) and to provide via interface 356 front modulator drive signals to control pixels 271 and sub-pixels (e.g., 272, 273, and/or 275, 277) of front modulator 270. Although not shown, controller 316 may be coupled to a suitably programmed computer having software and/or hardware interfaces for controlling rear modulators 350, 360 and front modulator 370 to produce projectable images 380. Note that any of the elements described in FIG. 3 may be implemented in hardware, software, or a combination of these. In other examples, front modulator 370 is an optical reflector of programmable reflectance that can adjust the intensity of light reflected on it resulting from illumination from rear modulators 350, 360.

Figure 4A:
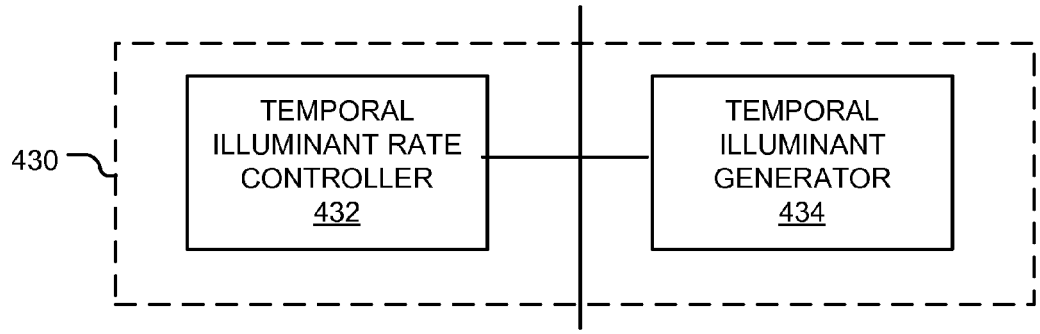
FIGS. 4A-4B illustrate functional block diagrams of examples of an illuminant synchronizer and a hybrid synthesis controller, according to at least some embodiments of the invention.
Figure 4B:
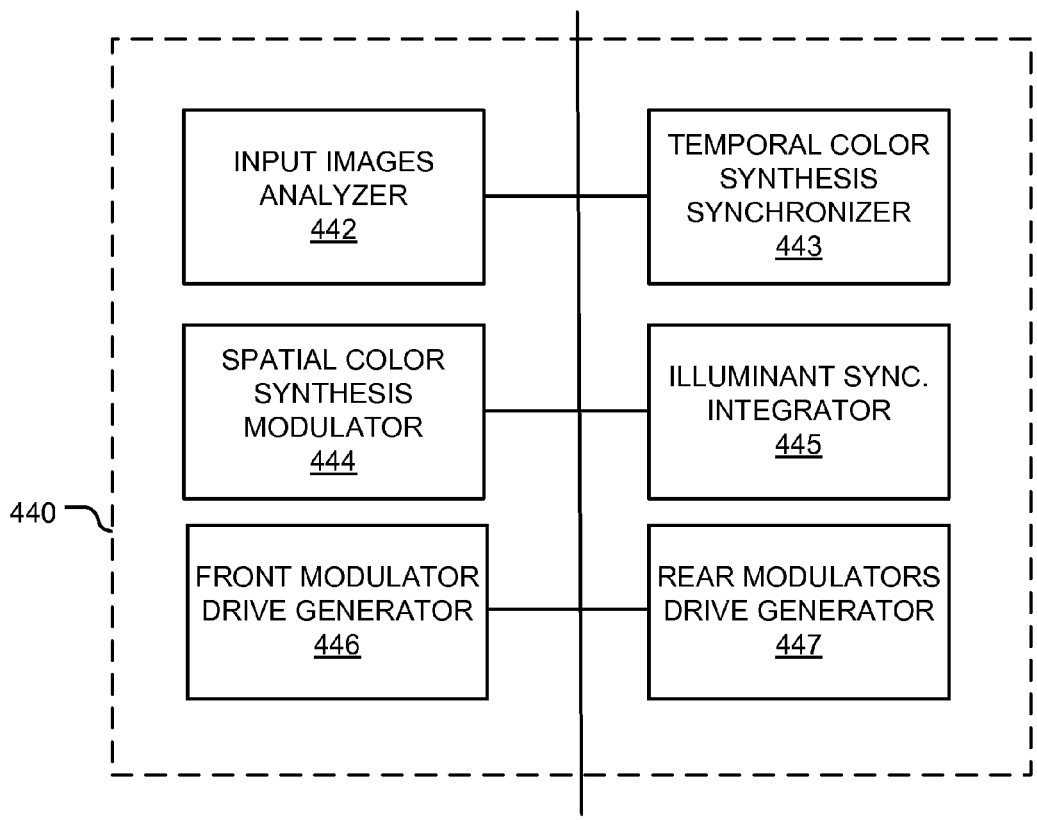

FIGS. 4A-4B illustrate functional block diagrams of examples of an illuminant synchronizer and a hybrid synthesis controller, according to at least some embodiments of the invention. FIG. 4A illustrates that illuminant synchronizer 430 may include: a temporal illuminant rate controller 432; and a temporal illuminant generator 434. Temporal illuminant generator 434 is configured to identify that a source of illumination, such as light from a light bulb, is usable by a projection system and can further provide light during one or more temporal fields. In some examples, a source of illumination may be from an illumination engine. In other examples, a source of illumination may be from a temporal color separator described herein. Temporal illuminant rate controller 432 is configured to determine and to make available to other portions of projection system the temporal rate at which the temporal color separator provides first and second illuminants. Illuminant synchronizer 430 of FIG. 4A and/or hybrid synthesis controller 440 of FIG. 4B can be implemented in software and/or hardware, such as an integrated circuit (IC) or Field Programmable Gate Array (FPGA), according to at least some embodiments.

FIG. 4B illustrates that hybrid synthesis controller 440 can include: an input image analyzer 442; a temporal color synthesis synchronizer 443; a spatial color synthesis modulator 444; an illuminant synchronization integrator 445; a front modulator drive generator 446; and rear modulators drive generator 447. Referring to FIGS. 1, 2B and 4B, input images analyzer 442 may accept input images 210 to identify pixel characteristics and associated information that the projectable images 180 should convey, such as the luminance and colors of each pixel. In some examples, analyzer 442 may accept an input video signal and create individual color content portions of the video signal, and associate such portions with certain modulators. In such examples, a green portion of an input image from a video signal may be determined by analyzer 442 to be represented on rear modulator 250 of FIG. 2A.

Temporal color synthesis synchronizer 443 may coordinate control as to when the rear modulators provide a sub-image to illuminate the front modulator, and as to when the front modulator should modulate such sub-images over first and second temporal fields. To this end, synchronizer 443 is configured to receive synchronization signals concerning operation of temporal color separator from illuminant synchronizer 430, and to manage the sequencing of modulation occurring first at the rear modulators and second at the front modulator.

Spatial color synthesis modulator 444 can function to coordinate the distribution of color synthesis imaging across the spatial domain. In some examples, spatial color synthesis modulator 444 may determine those portions of the array of sub-pixels at the front modulator that are controlled to effectuate appropriate additive color mixing of the low resolution sub-images to derive the high resolution sub-image by using color filters arranged as a plurality of two sub-pixel elements. Illuminant synchronization integrator 445 may accept signals from illuminant synchronizer 430 concerning the temporal rate that temporal color separator provides first and second illuminants, and may discern any timing information that should be coordinated with synchronizer 443, spatial color synthesis modulator 444, front modulator drive generator 446, and rear modulators drive generator 447.

Front modulator drive generator 446 is configured to provide drive signals that can cause sub-pixels at front modulator to alter their transmissivity. In some examples, generator 446 can provide the high frequency and high spatial resolution information derived from the input image(s) and analyzed by module 442 to control the sub-pixels at the front modulator. In other examples, analyzer 442 may determine, from input images and from image processing techniques, prediction values corresponding to luminance values for the sub-pixels at a front modulator, and in doing so, may coordinate with temporal color synthesis synchronizer 443 and integrator 445 to obtain synchronization signals associated with first and second temporal fields. Further, where the luminance values may be based on combinations of low resolution light patterns across temporal fields and with different illuminants, generator 446 may be in communication with modules 442-445 to generate and to deliver drive signals to selectively control the sub-pixels for which the prediction values have been determined. In other examples, the combination of modules 442-447 may be configured to provide control functionality where pixel data (e.g., including sub-pixel data) from an input image is scaled by predicted luminance values for a pixel or sub-pixel at a front modulator, determined based upon combinations of luminance values corresponding to low resolution light patterns modulated across temporal fields and with different illuminants. In yet further examples, generator 446 is configured to receive input from modules 442-445 and to provide signals to the front modulator to control a pixel array that may darken pixels and sub-pixels in the image that correspond to dark or black pixels or sub-pixels derived from the input images.

Rear modulators drive generator 447 is configured to provide the drive signals that can cause the modulating elements at the two rear modulators to produce a subset of sub-images that are low resolution versions of the input image. In some examples, generator 447 may determine, for example, an average or weighted average of the desired luminance values for those image areas corresponding to each modulating element of the rear modulators.

Note that modules of hybrid synthesizer 440 may be configured to perform other functionalities, as appropriate with the particular design implementation.

Figure 5A:
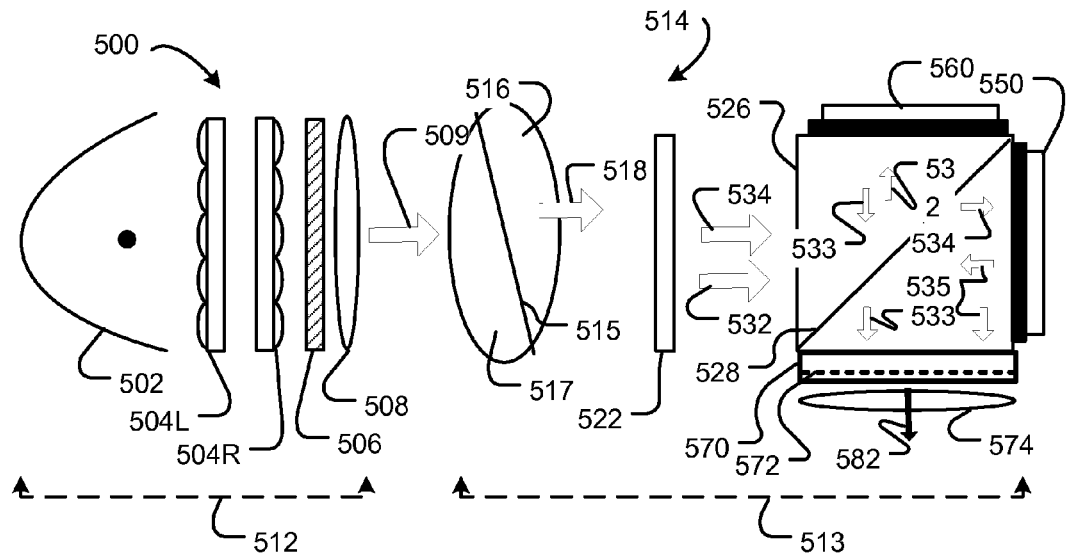
FIGS. 5A-5C illustrate some examples of a high dynamic range projection system, according to at least some embodiments of the invention.
Figure 5B:
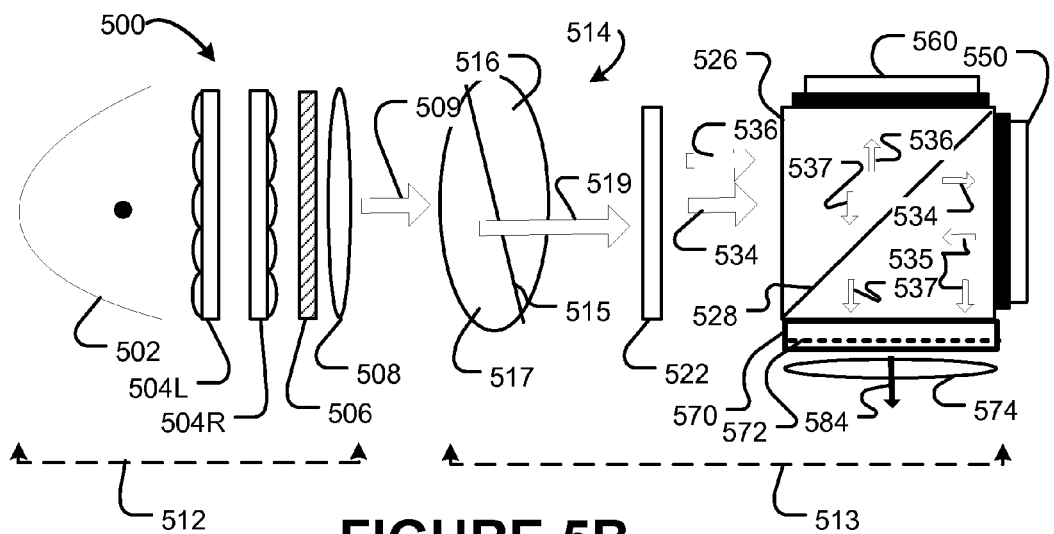

FIGS. 5A-5B illustrate some examples of a high dynamic range projection system, according to at least some embodiments of the invention. The projection systems of FIGS. 5A-5B can be composed of two reflective low resolution rear modulators and a higher resolution front modulator. In FIG. 5A, projection system 500 includes an illumination engine 512, a spectral-optical assembly 513, a rear modulator 550 and a rear modulator 560, a front modulator 570, and a projection lens assembly 574. Illumination engine 512 includes: a light source 502, a light homogenizer 504L and a light homogenizer 504R, filter 506, and collimating optics 508. Spectral-optical assembly 513 can include a temporal color separator 514, a retarder stack filter 522, a polarizing beam splitter 526.

Illumination engine 512 supplies a polarized white light field 509 (or light spectrum) along an optical path. Light source 502 radiate a light field incident through homogenizers 504L and 504R, and through filter 506 to produce a polarized light field. The light field passes through collimating optics 508 to enable the light field to travel in a substantially parallel manner to the next stage along the optical path. In some embodiments, the term "light field" may be used interchangeably with the term "light" and "light spectrum."

Light source 502 may function to provide a substantially uniform light output or spectrum with a relatively small arc size, and may function as a point source filament. To direct a maximal amount of light in a uniform manner onto the optical path, light source 502 may include a parabolic reflector disposed such that the light source arc (indicated by black dot) can be centered on the focus of the parabola. In some examples, light source 502 uses one or more ultra high pressure (UHP) mercury discharge lamps, such as that manufactured by Philips® Research, with a lamp power ranging from 100 Watts to several hundred Watts. In other examples, light source 502 is, but is not limited to, a halogen lamp, an incandescent lamp, an arc lamp, a laser, a light emitting diode (LED), an array of LEDs, other light emitting device, or other suitable high brightness lamp(s). In yet other examples, light source 502 is a part of a light source system with one or more mirrors, lenses, or other optical components, or light source 502 is one of many light sources, all of which cooperate to provide a uniform light output.

Light homogenizers 504L and 504R can be configured to provide for light field uniformity of the light field emitted from source 502, the uniform light field being usable to illuminate one or more rear modulators, which may in turn direct (e.g., transmit or reflect) light along an optical path. As input data (e.g., images, video) may be encoded as spatially flat, a spatially uniform response of the projection system 500 enables the luminance of the light incident on the modulators to be as uniform as possible. In some examples, light homogenizers 504L and 504R may be a lenticular paired lens array, which can include an array of small lenses, such as a lenticular lens array or a fly's eye array. With these examples, two identical arrays of rectangular lenses (e.g., 504L, 504R) may be disposed in the optical path of the light source 502 at one focal length apart. A first lens array (e.g., array 504L) may produce an array of images, which is focused onto the plane of a second lens array (e.g., array 504R), thereby producing an array of superimposed images of the arc. Although not specifically shown, a combining lens may be included to map the light field to a location adjacent or at a modulator to enhance uniform illumination for an input image. In other examples, light homogenizers 504L and 504R may be an integrator rod, or light pipe, which directs input light received from light source 502 to produce a spatially uniform light field at an exit aperture. These examples may respectively include a solid glass waveguide using total internal reflection, or a hollow assembly of mirrors, among others, which may enable the input light to integrate its output direction evenly as the light randomly reflects off of the interior surfaces of the integrator rod, for example, thereby producing a spatially uniform field. In still other examples, a light homogenizer may include a lens-array type of shaping optics.

Filter 506 can function to polarize input light field into a unidirectional linear-polarized light field that may cooperate with optical path components (e.g., polarizing beam splitters)

within spectral-optical assembly 513. In some examples, filter 506 may further provide infrared (IR) or ultra-violet (UV) filtration in the optical path in order to reduce thermal stress on components (e.g., polarizing filters) that may absorb light. In other examples, filter 506 is an IR filter implemented as a coating on either light homogenizer 504L or light homogenizer 504R. In yet other examples, a UV filter can be inserted along the blue channel of the light path so that UV light is transmitted through a dichroic mirror (i.e., disposed subsequently along the optical path) along with blue light during color synthesis processing. In further examples, filter 506 may include one or more filtration components that can convert p-polarized light supplied by light source 502 into s-polarized light, the former of which is transmitted through and the latter of which is reflected within spectral-optical assembly 513. Such components, while not shown, may include, but are not be limited to, polarized light beam splitters, mirrors, ½ wavelength plate, or any equivalent structure that may convert p-polarized light into s-polarized light.

Collimating optics 508 can function to enable the light field in the optical path to be telecentric. That is, collimating optics 508 can ensure that the light field is substantially parallel to the optical axis of the optical components disposed along the optical path of the projection system, and that a light field spread over distance can be reduced. In some examples, collimating optics 508 may include collimating lenses, that convert divergent light into parallel (e.g., collimated) light, and may be situated along the optical path before the rear modulators to reduce (i.e., mitigate) detrimental effects associated with imperfect collimation of light fields, if present. In examples of projection systems that have longer optical paths for certain light channels than for other channels, for example, due to the geometry of certain light guide components (e.g., color combining cube), multiple collimating lenses may be placed along the optical path to re-collimate the light field as it becomes divergent in its propagation along the optical path, thereby achieving consistent collimation across all three primary color channels (e.g., R, G, B).

Spectral-optical assembly 513 can include optical components to temporally separate (e.g., divide) the white light field, and to provide an optical path to illuminate the rear modulators and the front modulator. Temporal color separator 514 functions to separate light spectrum 509 into two independent light fields, each including a specific spectral power distribution, and each being an illuminant for rear modulators 550, 560. Temporal color separator 514 can include a divider 515 between a first color filter 516 and a second color filter 517. During a first temporal field ($t_1$), temporal color separator 514 supplies a first illuminant 518 as shown in FIG. 5A. During a second temporal field ($t_2$), temporal color separator 514 supplies a second illuminant 519 as shown in FIG. 5B. Illuminants 518 and 519 can correspond to a respective one of the color filters 516 and 517, which may include, by way of examples, but are not limited to, pairs of color elements selected from a group comprising cyan/yellow, blue/yellow, green/magenta, cyan/magenta, red/cyan, and magenta/yellow. These pairs of color elements are listed in the table of FIG. 12.

Retarder stack filter (RSF) 522 is an optical component that functions to selectively change the state of polarization (SOP) based on the wavelength of light incident thereon. In some examples, RSR 522 configures the SOP for short and long wavelengths (e.g., R and B, respectively) to be s-polarized, which is suitable for reflection at a portion of the polarizing beam splitter. Further, RSR 522 is configured to determine that the SOP for middle wavelengths (e.g., G) can be p-polarized for transmission through a polarizing beam splitter. In various embodiments, retarder stack filter 522 can be configured polarize any of one or more ranges of wavelengths to be either p-polarized or s-polarized to accommodate various illuminants and color filter schemes, examples of which are shown in FIGS. 11 and 12. As seen in FIG. 5A, during a first temporal field, $t_1$, RSF 522 selectively changes the state of polarization of first illuminant 518 having a first spectral power distribution to a first subset of colors including (first and second) primary colors 532 and 534. In such examples where the first illuminant 518 is cyan, primary color 532 may be blue with s-polarization, and primary color 534 may be green with p-polarization. Note that the terms "primary color light field" may be used interchangeably with the terms "primary color", according to some embodiments.

As seen in FIG. 5B, during a second temporal field, $t_2$, RSF 522 selectively changes the state of polarization of second illuminant 519, having a second spectral power distribution, to a second subset of colors including primary colors 534 and 536. In those examples where second illuminant 519 is yellow, (third) primary color 536 may be red with s-polarization, and primary color 534 may be green with p-polarization. In other examples where a retarder stack filter is used in conjunction with a polarizing beam splitter for both color and polarization management, additional optical components may be included (although not shown) to address high system sensitivity to, for example, skew rays or off-axis rays. In yet other examples, the RSF 522 is implemented using a color select filter, or ColorLink® retardation plates, manufactured by ColorLink®, Inc., of Boulder, Colo., U.S.A.

Polarizing beam splitter array (PBS) 526 is a reflective polarizing optical component that uses birefringent layers to separate unpolarized light into orthogonal state of polarization components, for example, to enable s-polarized light to be reflected and p-polarized light to be transmitted. PBS 526 is configured to accept randomly polarized light onto a birefringent surface 528 at about 45 degrees incidence, at which point, s-polarized light can be reflected onto an adjacent array element, while p-polarized light can be transmitted through surface 528 unimpeded. In some examples, PBS 526 may be used to produce a polarized illumination beam.

Rear modulators 550 and 560 may function to provide a subset of sub-images representing low resolution versions of an input image, by modulation. For example, rear modulators 550 and 560 can provide for pixel-wise (and/or sub-pixel-wise) control of light intensity incident thereon in accordance with one or more control signals received from a controller containing low resolution data about the input image. Rear modulators 550 and 560 can be implemented using many types of structures. In some examples, modulators 550 and 560 may comprise an array of LCD elements each having controllable transmissivity disposed in the optical path of a reflective backing. Light fields from an optical path that illuminate on rear modulators 550 and 560 can pass through each LCD element and can be reflected back through the LCD element by the reflective backing. The luminance at a point on the rear modulator may be determined by the intensity of light received at that point and by the degree to which the LCD element at that point on the modulator absorbs light being directed through the LCD element. In some examples, rear modulators 550 and 560 are reflective liquid crystal on silicon (LCoS) modulators. In some examples of a modulator with a reflective backing, incoming light with an initial polarization state may be reflected with either the same polarization state or with a polarization state rotated by 90 degrees, or with a polarization state rotated by another degree in between 0-to-90 based upon a drive level provided to the modulator. In those situations where the modulator is off, the incoming light may be reflected with unchanged SOP. In such examples, the reflective backing can function to convert the SOP of the light field incident thereon. In some examples, the reflective backing may cause s-to-p SOP conversion, wherein incident light fields having s-polarization may be reflected by rear modulators with p-polarization. In other examples, the reflective backing may cause p-to-s SOP conversion, wherein incident light fields having p-polarization may be reflected by rear modulators with s-polarization. In such examples, the modulator may change the SOP within each pixel cell (or sub-pixel) to modulate the intensity of light on a particular color channel (e.g., red, green and blue). In further examples, rear modulator 550 may have a reflective backing that causes p-to-s SOP conversion, while rear modulator 560 may have a different reflective backing that causes s-to-p SOP conversion as appropriate for the optical path chosen.

Front modulator 570 may be adapted to receive the subset of sub-images (e.g., superimposed light patterns), representing the low resolution versions of the input image, along the optical path from the rear modulators. Front modulator 570 is configured to produce a high (spatial) resolution sub-image that is modulated with the subset of (superimposed) sub-images to add high resolution and high frequency information derived from the input image. In doing so, front modulator 570 is configured to produce a projectable image having a contrast ratio of a high dynamic range image, formed from the product (i.e., multiplicative combination) of the contrast ratio of the (lower resolution) sub-images with the contrast ratio of the high(er) spatial resolution sub-image produced by modulator 570. Modulator 570 also can include a filter having, in some embodiments, a plurality of two sub-pixel elements. Exemplary pairs of colors that may be used with the two sub-pixel elements may be found in the table of FIG. 12. In other embodiments, any number of sub-pixel elements can be used in connection with a pixel.

Projection lens assembly 574 can be configured to provide the functionality of projecting the image produced by the front modulator 570 onto an object plane, that is not shown and that is external to the projection system. In some examples, projection lens assembly 574 may include multiple individual lens elements. In other examples, projection lens assembly 574 may have relatively high magnification characteristics, such as between 50 to 100 times. In still other examples, projection lens assembly 574 may have a low chromatic aberration, such as less than ½ the pixel (or sub-pixel) variation. Other exemplary characteristics of projection lens assembly 574, may include, but are not limited to: a high resolution that preserves the contrast ratios of an output image in high spatial frequency content; an accommodation of large field output light; a low distortion tolerance so that in certain situations, the edges of a rectangular image may be bowed no more than slightly; a long back focal length so that the distance between the lens assembly and the object plane is sufficiently large so as to accommodate a color combining cube in certain implementations of a projection system; the provision of a telecentric light output to be projected to the object plane; a high optical performance capability, aided by a relatively low f-number so as to mitigate light rays incident to the lens assembly at extreme angles; and, a low convergent back reflection without increasing black levels to the point of adversely affecting image contrast, such as for example, with liquid crystal on silicon (LCoS) modulators.

Referring to FIGS. 5A-B, examples are described, wherein temporal color separator 514 is a color wheel with first color filter 516 being of cyan color and second color filter 517 being of yellow color. In such examples, rear modulators 550 and 560 are reflective LCoS modulators, front modulator 570 is a transmissive LCD-type modulator, and filter 572 may have a plurality of green-magenta sub-pixels. Note that while not shown specifically, the color wheel can include electro-mechanical components, such as a motor among others, to facilitate operation. Note further that other types of temporal color-separating devices may be used, including, but not limited to, color drums or cylinders, electronically controlled selective polarization filters, dichroic color separating devices, and other color-separating devices that may generate illuminants as a function of time. In yet further examples, color filters for the rear modulators may be used, such as blue and yellow color filters for the two rear modulators, along with image processing circuitry and techniques that prevent color errors and incorporate high resolution control at the rear modulators. Note that in other examples, other types of reflective and transmissive modulators may be used, as appropriate with specific configurations of an optical path for a projection system.

Illumination engine 512 can be configured to supply a polarized white light 509 along an optical path and incident on the color wheel. The cyan and yellow color filters may be sequentially positioned along the optical path for the duration of time that elapses as a function of the rotating color wheel.

As illustrated in FIG. 5A, during a first temporal field, the cyan filter is in the optical path so that a first illuminant 518 of cyan color is supplied to RSF 522, as coordinated by the illuminant synchronizer and hybrid synthesis controller. RSF 522 may convert the cyan illuminant to a first subset of colors including primary colors 532 and 534, which in turn, can be supplied to PBS 526. First primary color 532 is blue and of s-polarization, and second primary color 534 is green and of p-polarization. As the first subset of blue and green light fields enter the PBS 526, the primary color 534 of green passes through birefringent surface 528 and illuminates rear modulator 550, which, when modulated, produces a green sub-image (e.g., 152 in FIG. 1) as a green-colored low resolution version of the input image. The reflective backing of rear modulator 550 is configured to cause the conversion of p-to-s SOP, so that primary color light field 535, which represents the green low resolution sub-image having s-polarization, is reflected by rear modulator 550 towards birefringent surface 528 along the optical path. The green-colored low resolution sub-image represented by primary color 535, in turn, can reflect from surface 528 and be directed to illuminate front modulator 570.

Contemporaneously (or substantially contemporaneously) during the first temporal field and within PBS 526, primary color 532 of blue can reflect from birefringent surface 528 and illuminate front modulator 560, which, when modulated, can produce a blue sub-image as a blue-colored low resolution version of the input image. The reflective backing of rear modulator 560 is configured to cause the conversion of s-to-p SOP so that the blue low resolution sub-image having p-polarization, as represented by primary color light field 533, is reflected by rear modulator 560 towards and through birefringent surface 528 along the optical path. The blue-colored low resolution sub-image represented by primary color 533 can illuminate modulator 570. Accordingly, during a first temporal field, a subset of sub-images represented by primary color light fields 533 and 535 are superimposed upon modulator 570.

As illustrated in FIG. 5B, during a second temporal field, the yellow filter is positioned in the optical path so that a second illuminant 519 (of yellow color) is supplied to RSF 522, as coordinated by the illuminant synchronizer and hybrid synthesis controller. RSF 522 may convert the yellow illuminant to a second subset of colors including (second and third) primary colors 534 and 536, which, in turn, are supplied to PBS 526. In these examples, third primary color 536 may be red and of s-polarization, and second primary color 534 may be green and of p-polarization. As the second subset of red and green light fields enter the PBS 526, primary color 534 of green passes through birefringent surface 528 and illuminates rear modulator 550, which when modulated produces a green-colored sub-image being a green-colored low resolution version of the input image. As previously described in FIG. 5A, primary color 534 of green, may pass through surface 528, illuminate rear modulator 550, be modulated to produce a green-colored low resolution sub-image with an s-SOP represented by primary color light field 535, and be directed by the reflective backing of modulator 550 and by surface 528 to illuminate modulator 570.

Contemporaneously (or substantially contemporaneously) during the second temporal field and within PBS 526, primary color 536 of red reflects from birefringent surface 528 and illuminates rear modulator 560, which when modulated produces a red sub-image being a red-colored low resolution version of the input image. The reflective backing of rear modulator 560 is configured to cause conversion of s-to-p SOP so that the red sub-image of p-polarization, represented by primary color light field 537, may be reflected by modulator 560 towards and through birefringent surface 528 along the optical path to illuminate modulator 570. Accordingly, during a second temporal field, a subset of sub-images represented by primary color light fields 535 and 537 are superimposed upon modulator 570.

By comparing FIG. 5A with FIG. 5B, note that RSF 522 is configured to supply s-polarized blue or red light to rear modulator 560, so that at respective time intervals, namely first temporal field and second temporal field, blue or red light reflects from rear modulator 560. As such, rear modulator 560 is configured to operate as a blue modulator and as a red modulator, and switches its role back and forth in time over a frame. Rear modulator 560 can be adapted to accept blue or red s-polarized light in a respective temporal time-slice, and can change the SOP to p-polarization so that the blue or red light is transmitted through surface 528 to illuminate the front modulator 570. An example of temporal color switching may be seen in FIG. 11, which illustrates a chart of an example of hybrid color synthesis, according to at least some embodiments of the invention.

During the first temporal field, front modulator 570 is configured to modulate the green and blue low resolution superimposed sub-images with a high resolution sub-image associated with data derived from the input image, as coordinated by the illuminant synchronizer and the hybrid synthesis controller, to illuminate the green and magenta sub-pixels of filter 572, thereby producing a first output sub-image 582 having cyan (green+blue) color. During the second temporal field, front modulator 570 is configured modulate the green and red low resolution superimposed sub-images with a high resolution sub-image associated with data derived from the input image to illuminate the green and magenta sub-pixels of filter 572, thereby producing a second output sub-image 584 having yellow (green+red) color. Over both first and second temporal fields, hybrid color synthesis is achieved: first with the temporal color synthesis by imaging the first and second output sub-images 582 and 584 sequentially and successively over two temporal fields at front modulator 570; and second with the spatial three-dimensional color synthesis of sub-images 582 and 584 with a high resolution sub-image and filter 572 at modulator 570 to thereby produce a projectable image with high dynamic range contrast ratio that is configured to be projected with lens assembly 574.

High dynamic range projection systems of FIGS. 5A and 5B can be implemented using other color combination of backlight fields and color filters (e.g., in pixel mosaics), according to various embodiments. Examples of such combinations are depicted in FIGS. 11 and 12. In alternate embodiments, high dynamic range projection systems of FIGS. 5A and 5B are modified to include an additional front modulator 570' and an optional additional filter 572' (not shown) that are configured to cooperate with front modulator 570 and filter 572 to generate high resolution projectable images. In some embodiments, front modulators 570 and 570' and filters 572 and 572' are arranged to operate similar to components 170 and 170' and components 171 and 171' of FIG. 1. In some embodiments, front modulators 570 and 570' are configured to share filter 572.

Figure 5C:
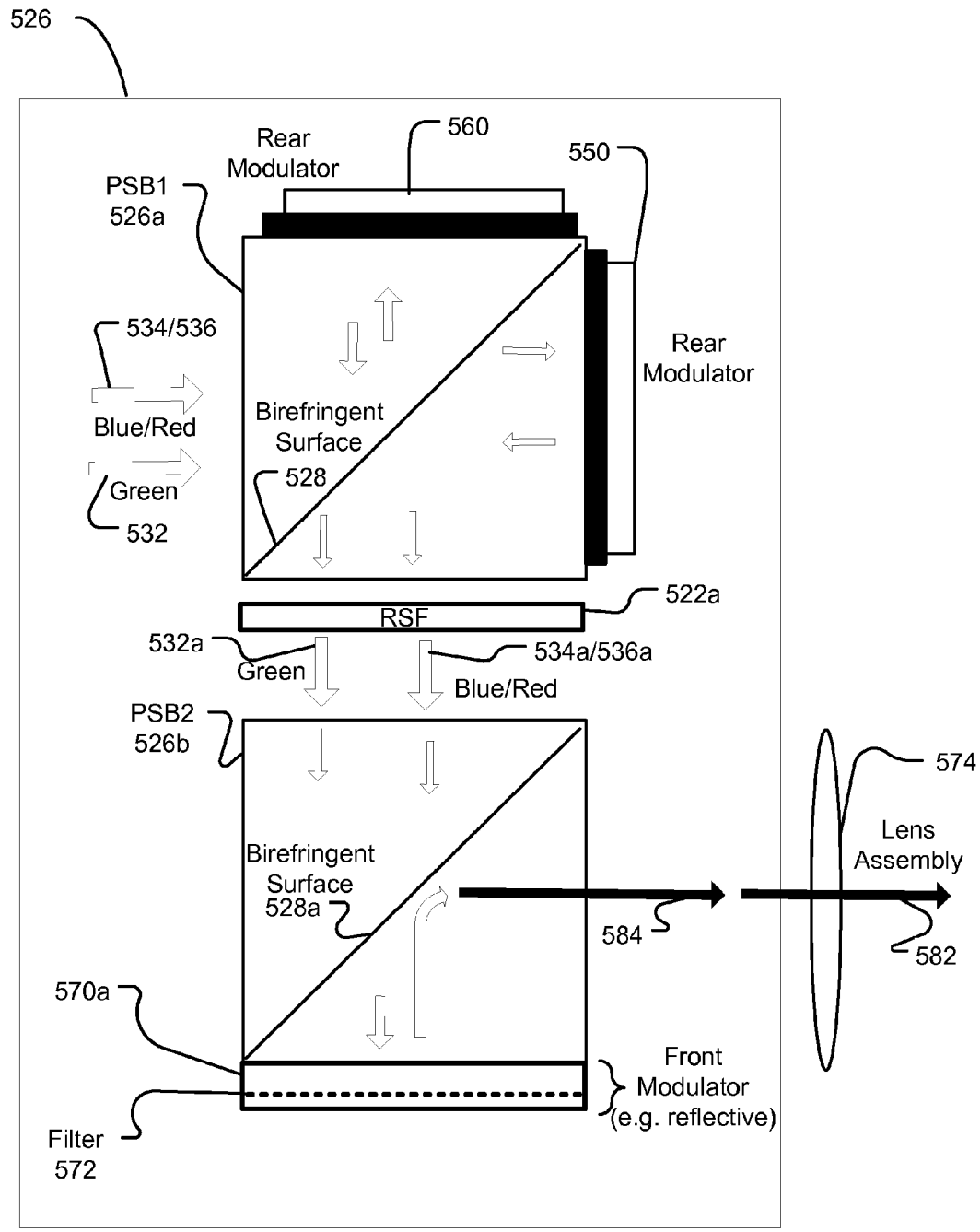

FIG. 5C depicts another example of a portion of a polarizing beam splitter of FIGS. 5A and 5B, according to alternate embodiments. As shown, polarizing beam splitter 526 can include a polarizing beam splitter ("PBS 1") 526a and a polarizing beam splitter ("PBS 2") 526b. Polarizing beam splitter ("PBS 1") 526a can include a structure and/or functionality that are similar or equivalent to that described in FIGS. 5A and 5B. Polarizing beam splitter 526 of FIG. 5C can include a retarder stack filter 522a to, for example, modify the polarization of a green-colored low resolution sub-image, and/or red-colored and blue-colored low resolution sub-images to produce polarized green sub-image 532a or polarized blue sub-image 534a (or red sub-image 536a). For example, green sub-image 532a and polarized blue sub-image 534a (or red sub-image 536a) are polarized to have equivalent states of polarization (SOP) so that sub-images 532a, 534, and 536a can pass through birefringent surface 528a to illuminate front modulator 570a. In the example shown, front modulator 570a is a reflective modulator, such as any of those described herein, and can operate in conjunction with filter 572 (e.g., an array of color elements). In some embodiments, front modulator 570a is a reflective type of relatively high resolution, such as an LCoS modulator. In operation, front modulator 570a generates high-resolution sub-images 582 and 584, which are reflected by birefringent surface 528a to lens assembly 574 to superimpose sub-images to produce projectable images.

Figure 6A:
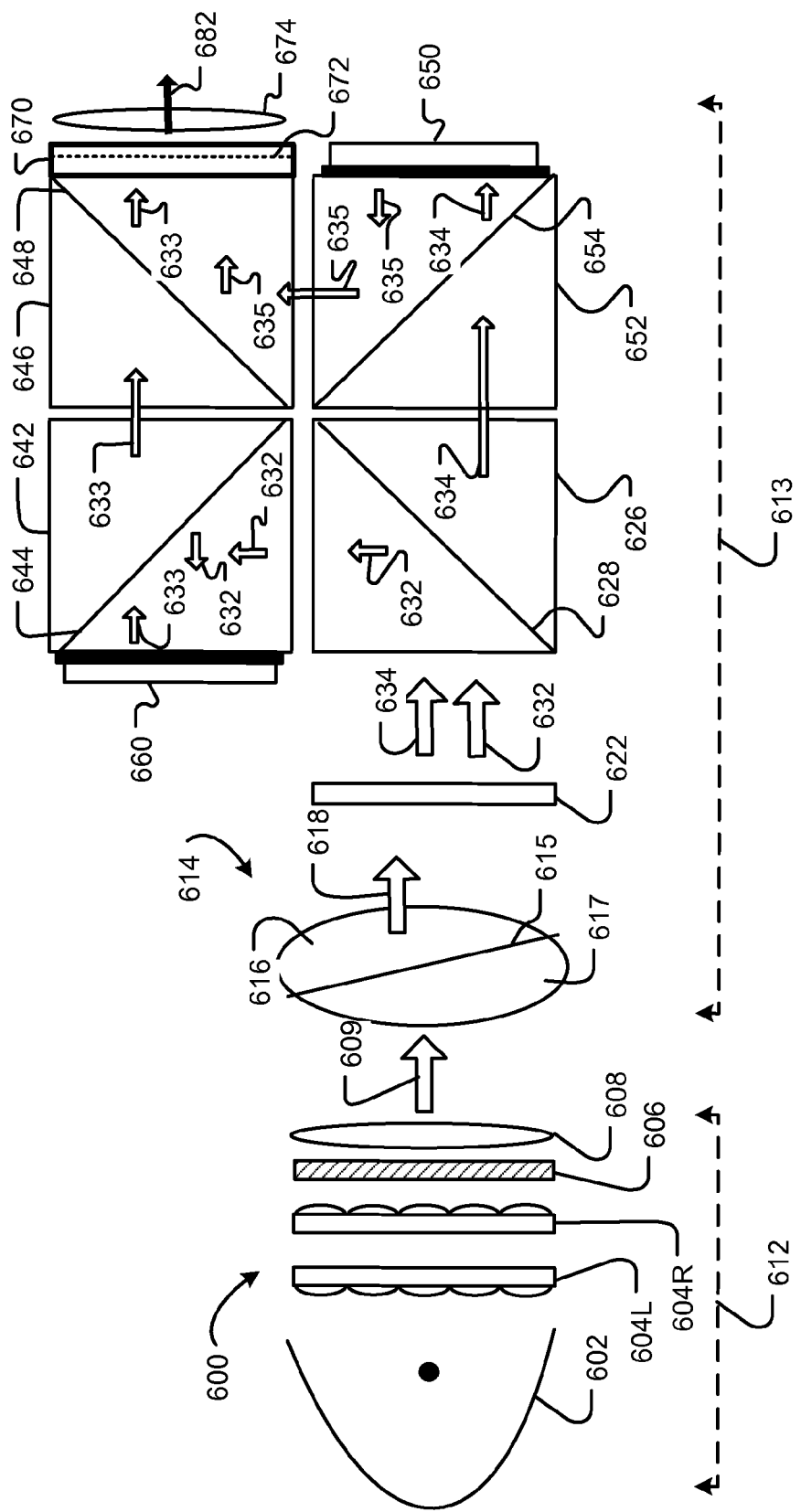
FIGS. 6A-6B illustrate other examples of a high dynamic range projection system, according to at least some embodiments of the invention.
Figure 6B:
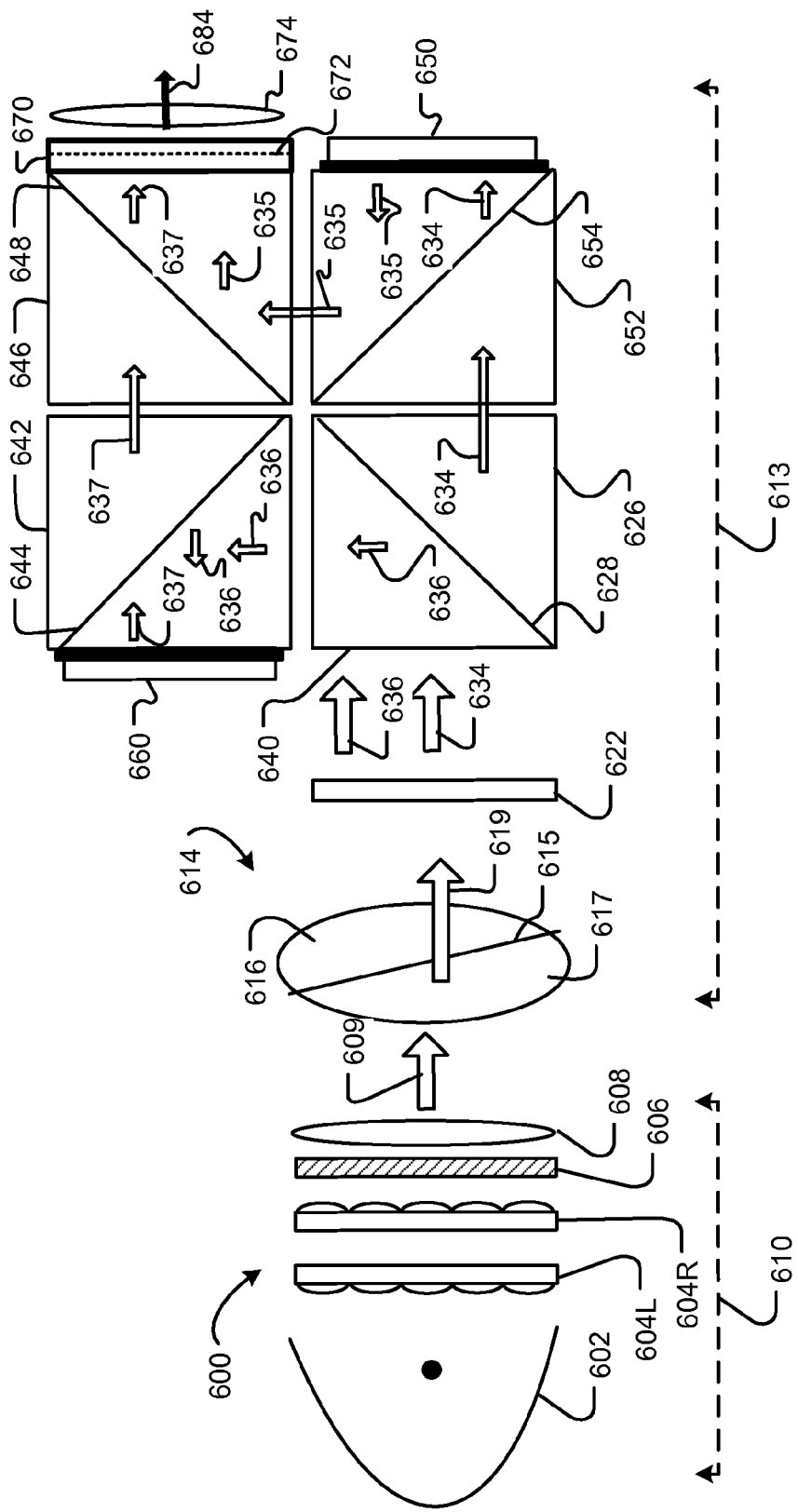

FIGS. 6A-6B illustrate other examples of a high dynamic range projection system, according to at least some embodiments of the invention. The projection systems of FIGS. 6A-6B can be composed of reflective-type low resolution rear modulators and a higher resolution front modulator. FIG. 6A depicts a projection system 600 that can include an illumination engine 612, a spectral-optical assembly 613, a rear modulator 650, a rear modulator 660, a front modulator 670 with filter 672, and a projection lens assembly 674. Illumination engine 612 can include a light source 602, a light homogenizer 604L, a light homogenizer 604R, filter 606, and collimating optics 608, all of which may function similarly to illumination engine 512 previously described with respect to FIGS. 5A-5B.

Spectral-optical assembly 613 can include a temporal color separator 614, a retarder stack filter 622, a polarizing beam splitter (PBS) 628 with birefrigent surface 628, a PBS 642 with birefrigent surface 644, a PBS 646 with birefrigent surface 648, and a PBS 652 with birefringent surface 654. In some examples, temporal color separator 614 may be a color wheel having a divider 615, with a first color filter 616 configured to emit cyan light and a second color filter 617 configured to emit yellow light, similar to temporal color separator 514. Further, rear modulators 650 and 660 are reflective LCoS modulators, front modulator 670 is a transmissive LCD-type modulator, and filter 672 may have an array of green-magenta sub-pixels. Note that in some embodiments, other temporal color-separating devices and/or other types of reflective and transmissive modulators may be used, as appropriate for a specific configuration of an optical path for a projection system. Illumination engine 612 can be configured to supply a polarized white light 609 along an optical path to the color wheel. The cyan and yellow color filters of the color wheel may be sequentially positioned along the optical path for a duration of time that elapses as a function of the rotating color wheel.

As illustrated in FIG. 6A, a cyan filter is disposed in the optical path during a first temporal field so that a first illuminant 618 of cyan color is supplied to RSF 622, as coordinated by the illuminant synchronizer and hybrid synthesis controller. RSF 622 may convert the cyan-colored illuminant to a first subset of colors that include primary colors 632 and 634, which, in turn, are supplied to PBS 626. First primary color 632 may be blue and of s-polarization, and second primary color 634 may be green and of p-polarization. As the first subset of light patterns in blue and green light enter the PBS 626, primary color 634 of green (e.g., green light pattern) passes through birefringent surface 628, enters PBS 652, passes through birefringent surface 654 and illuminates rear modulator 650. Rear modulator 650 can produce a green sub-image as a green-colored low resolution version of the input image, when controlled by illuminant synchronizer and hybrid synthesis controller. The reflective backing of rear modulator 650 is configured to cause the conversion of p-to-s SOP, so that primary color light field 635, which represents the green sub-image having s-polarization, is reflected by rear modulator 650 towards birefringent surface 654, which, in turn, is reflected by surface 654 towards PBS 646 along the optical path. The green sub-image represented by primary color 635, enters PBS 646 and is reflected from surface 648 to illuminate front modulator 670.

Contemporaneously (or substantially contemporaneously) during the first temporal field and within PBS 626, first primary color 632 of blue reflects from birefringent surface 628, enters PBS 642, reflects from surface 644 and illuminates rear modulator 660. Rear modulator 660 can produce a blue sub-image being a blue-colored low resolution version of the input image, when controlled by illuminant synchronizer and hybrid synthesis controller. The reflective backing of rear modulator 660 is configured to cause the conversion of s-to-p SOP for primary color 632 to produce primary color light field 633, which represents the blue sub-image having p-polarization, and is reflected by rear modulator 660 towards and through birefringent surface 644 towards PBS 646 along the optical path. Primary color 633 enters PBS 646, passes through surface 648, and illuminates high resolution modulator 670. Accordingly, during a first temporal field, a subset of sub-images represented by primary color light fields 633 and 635 are superimposed upon modulator 670.

As illustrated in FIG. 6B, during a second temporal field, the yellow filter is disposed in the optical path so that a second illuminant 619 (of yellow color) may be supplied to RSF 622, as coordinated by the illuminant synchronizer and hybrid synthesis controller. RSF 622 may convert the yellow illuminant to a second subset of colors that include primary colors 634 and 636 that are supplied to PBS 626. In these examples, third primary color 636 may represent the red sub-image of s-polarization, and second primary color 634 may represent the green sub-image of p-polarization. As the second subset of red and green light enter the PBS 626, primary color 634 representing the green sub-image passes through birefringent surface 628, enters PBS 654, passes through surface 654, and illuminates rear modulator 650. Modulator 650 then can produce a green sub-image being a green-colored low resolution version of the input image, under the coordination of the illuminant synchronizer and the hybrid synthesis controller. The reflective backing of rear modulator 650 are configured to cause conversion of p-to-s SOP so that the primary color light field 635, as represented by the green sub-image having s-polarization, is reflected by rear modulator 650 to surface 654, which in turn, can reflect the second primary color 635 in a direction towards PBS 646. Primary color light field 635 then can enter PBS 646, and is reflected by surface 648 to illuminate front modulator 670.

Contemporaneously (or substantially contemporaneously) during the second temporal field and within PBS 626, third primary color 636 of red light can reflect from birefringent surface 628 to enter PBS 642. Then, primary color 636 can reflect from surface 644 to illuminate rear modulator 660. Rear modulator 660 then can produce a red sub-image being a red-colored low resolution version of the input image, under the coordination of illuminant synchronizer and the hybrid synthesis controller. The reflective backing of rear modulator 660 is configured to cause conversion of s-to-p SOP so that primary color light field 637, which can represent the red sub-image having p-polarization, is reflected by rear modulator 660 through birefringent surface 644 along the optical path towards PBS 646. Primary color 637 then can enter PBS 646, pass through surface 648 and illuminate front modulator 670. Accordingly, during a second temporal field, a subset of sub-images represented by primary color light fields 635 and 637 are superimposed upon modulator 670.

During the first temporal field, front modulator 670 is configured to modulate the green and blue low resolution superimposed sub-images with a high resolution sub-image associated with data derived from the input image, as coordinated by the illuminant synchronizer and the hybrid synthesis controller, to illuminate green and magenta sub-pixels of filter 672, thereby producing a first output sub-image 682 having cyan (green+blue) color. During the second temporal field, front modulator 670 is configured to modulate the green and red low resolution superimposed sub-images with a high resolution sub-image associated with data received from the input image to illuminate the green and magenta sub-pixels of filter 672, thereby producing a second output sub-image 684 having yellow (green+red) color. Over both first and second temporal fields, hybrid color synthesis is achieved: first with the temporal color synthesis by imaging the first and second output sub-images 682 and 684 sequentially and successively over two temporal fields at front modulator 670; and second with the spatial three-dimensional color synthesis of sub-images 682 and 684 with a high resolution sub-image and filter 672 at modulator 670 to thereby produce a projectable image with high dynamic range contrast ratio that is configured to be projected with lens assembly 674.

High dynamic range projection systems of FIGS. 6A and 6B is implemented using any other color combination of backlight fields and color filters (e.g., in pixel mosaics), according to various embodiments. Examples of such combinations are depicted in FIGS. 11 and 12. In some embodiments, modulator 670 is implemented a reflective-type modulator similar to, for example, modulator 570a of FIG. 5C. In still yet other embodiments, high dynamic range projection systems of FIGS. 6A-6B are configured to include an additional modulator 670' and an additional filter 672' (not shown) that are configured to cooperate with modulator 670 and filter 672 to generate high resolution projectable images. For example, modulators 670 and 670' and filters 672 and 672' are arranged to operate similar to components 170 and 170' and components 171 and 171' of FIG. 1. In some embodiments, front modulators 670 and 670' are configured to share filter 672, which is positioned in suitable locations in, for example, spectral-optical assembly 613.

Figure 7A:
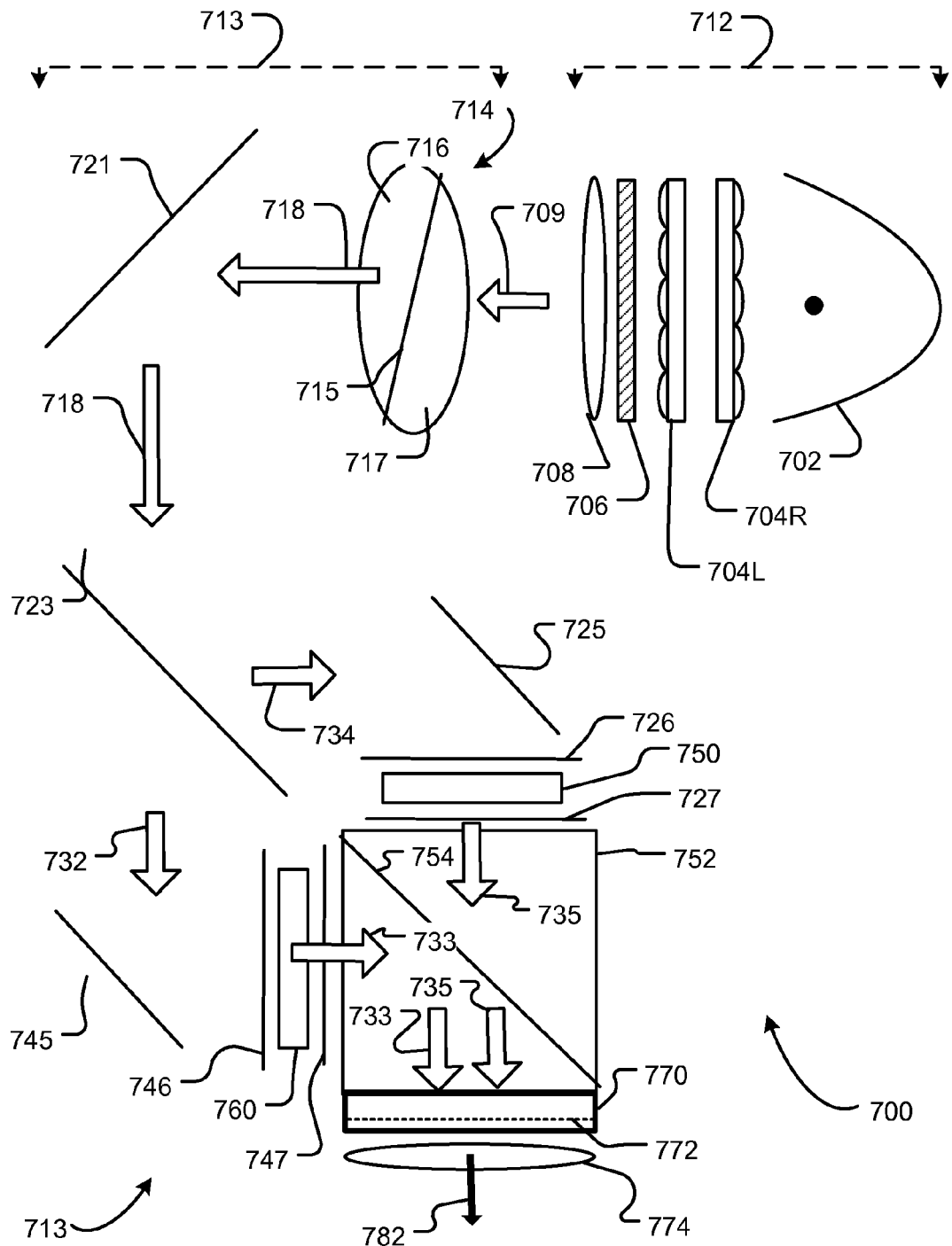
FIGS. 7A-7B illustrate yet other examples of a high dynamic range projection system, according to at least some embodiments of the invention.
Figure 7B:
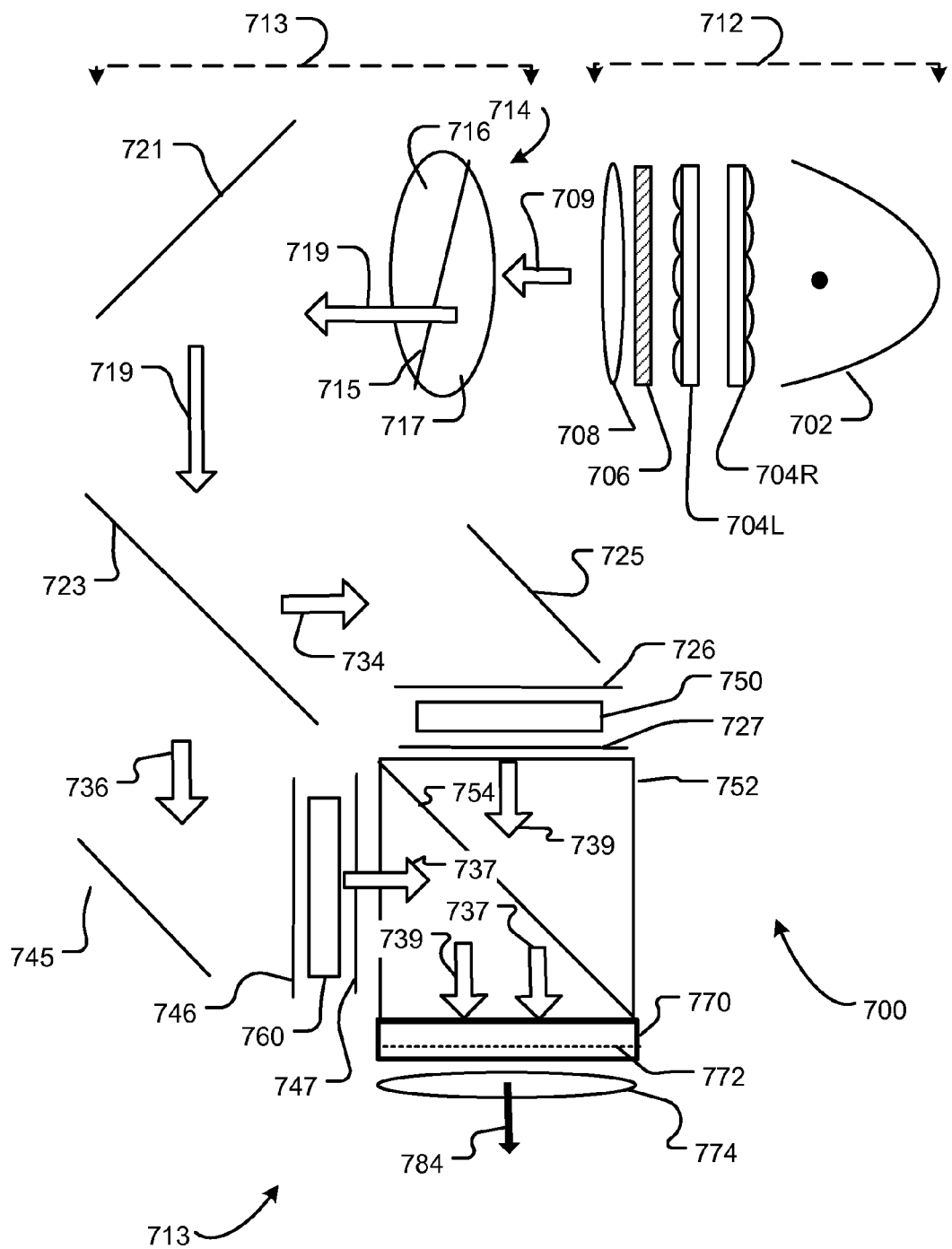

FIGS. 7A-7B illustrate yet other examples of a high dynamic range projection system, according to at least some embodiments of the invention. In some embodiments, an HDR projection system is used with transmissive-type low resolution rear modulators and with a higher resolution front modulator. In FIG. 7A, projection system 700 can include illumination engine 712, a spectral-optical assembly 713, a rear modulator 750, a rear modulator 760, a front modulator 770 with filter 772, and a projection lens assembly 774. Illumination engine 712 can include a light source 702, a light homogenizer 704L, a light homogenizer 704R, filter 706, and collimating optics 708, all of which may function similarly to illumination engines 512 and 612 previously described in FIGS. 5A-B and 6A-B, respectively. Illumination engine 712 can supply white light 709 being predominantly s-polarized along an optical path to temporal color separator 714.

Spectral-optical assembly 713 can include a temporal color separator 714, mirrors 721, 725 and 745, a dichroic mirror 723, filters 726, 727, 746, and 747, and a polarizing beam splitter (PBS) 752 with birefringent surface 754. In some examples, temporal color separator 714 is a color wheel with divider 715, where a first color filter 716 is configured to emit cyan light, and a second color filter 717 is configured to emit yellow light. The cyan and yellow color filters are sequentially positioned along the optical path as a function of time, as determined by the rotation of the color wheel, in a manner as previously described in FIGS. 5A-B, 6A-B. In such examples, rear modulators 750 and 760 are transmissive LCD-type modulators or LCD microdisplays, front modulator 770 is a transmissive LCD-type modulator, and filter 772 may have a plurality of green-magenta sub-pixels. In such examples, PBS 752 may be, but is not limited to, an X-cube, a color combining cube, or any other color combining system that functions to recombine certain colors of light that have been separated. In the examples shown, FIGS. 7A and 7B depict the use of a polarizing beam splitter. In other examples, a color combining cube facilitates color synthesis by superimposing different light patterns of different colors. Note that in yet other examples, other temporal color separating devices, and other types of transmissive modulators may be used for specific configurations of a spectral-optical assembly or other components may be used to determine an optical path for a projection system. Mirrors 721, 725 and 745 can reflect light incident thereon to be directed at an angle commensurate with the optical path, and dichroic mirror 723 can function to spatially separate certain colors of light. By way of example, dichroic mirror 723 is a thin-film color filter that selectively passes light of a certain wavelength (i.e., corresponding to a certain range of colors) and that reflects light of other wavelengths (i.e., corresponding to other colors). Note that the filtration response of dichroic mirror 723 may be dependent upon the incidence angle of incoming light field. Filters 726 and 746 can function to change the state of polarization (SOP) of respective light fields incident thereon, respectively, to be orthogonal to each other (i.e., orthogonal relative to a transmission axis) so as to be respectively transmitted or reflected by other optical components along the optical path. In some embodiments, the SOP is changed on a pixel-by-pixel basis (or a sub-pixel-by-sub-pixel basis) by 0 to 90 degrees, depending on the image to be projected. In some examples, filters 726 and 746 are referred to as clean-up filters, and may include, but are not limited to, wire-grid (reflective) polarizers and absorptive polarizers. Filters 727 and 747, which may be referred to interchangeably as analyzers, may be disposed on the imaging side of rear modulator 750 and rear modulator 760. In some examples, filters 726 and 746 are optional. In other examples, filters 726 and 746 can function to polarize colors of light that have been separated so that they may cooperate with certain types of PBS 752. Further, PBS 752 is implemented as a color combining cube, and filters 727 and 747 are configured to polarize red and green light to have s-polarization, and blue light to have p-polarization, respectively. In other examples, filters 727 and 747 may cooperate with rear modulators 750 and 760 to transmit or absorb light so as to provide for a desired projectable image.

As illustrated in FIG. 7A, a cyan filter is in the optical path during a first temporal field so that a first illuminant 718 of cyan light is supplied to mirror 721, which reflects the cyan light towards dichroic mirror 723. Dichroic mirror 723 then can separate the cyan illuminant into a first subset of colors including primary colors 732 and 734. Dichroic mirror 723 reflects primary color 734 as green light towards mirror 725, which, in turn, directs the green light towards filter 726. In at least one embodiment, light for primary color 734 can be generated to be s-polarized, based on the polarization of illuminant 718. In this case, filter 726 can be configured to receive the light for primary color 734 as s-polarized light. Rear modulator 750 is configured to modulate the green light for primary color 734 to produce a green sub-image being a green-colored low resolution version of the input image, as coordinated by the illuminant synchronizer and hybrid synthesis controller. In this case, filter 727 is configured to reorient (i.e., filter) the polarization for the light for primary color 734 so that the light for primary color 734 is a p-polarized light field 735 (e.g., green sub-image) that enters PBS 752. Light field 735 (e.g., p-polarized green sub-image) can then pass through surface 754 to illuminate front modulator 770, as represented by primary color 735.

Contemporaneously (or substantially contemporaneously) during the first temporal field, dichroic mirror 723 can allow transmission of light for first primary color 732, which can be blue, towards mirror 745, which can direct the blue light towards filter 746. In at least one embodiment, light for primary color 732 is generated to be s-polarized, based on the polarization of illuminant 718. In this case, filter 746 can be configured to receive light for primary color 732 as s-polarized light. Rear modulator 760 is configured to modulate the blue light for primary color 732 to produce a blue luminance sub-image 733 being a blue-colored low resolution version of the input image, as coordinated by the illuminant synchronizer and hybrid synthesis controller. For example, filter 747 can filter primary color 732 so that s-polarized light can pass to produce blue light field 733, so that the blue sub-image may enter PBS 752 and reflect from birefringent surface 754 to illuminate front modulator 770. Accordingly, during a first temporal field, a subset of sub-images represented by primary color light field 733, which can be s-polarized, and light field 735, which can be p-polarized, are superimposed upon modulator 770.

In some embodiments, s-polarized blue light 732 (or s-polarized red light 736 of FIG. 6B) is changed to p-polarized light by using known optical techniques, such as, for example, using half wave plates. Filter 746 then is configured to receive blue light 732 and red light 736 as p-polarized light. In at least one embodiment, filter 746 is configured as a p-oriented clean-up polarizer. Then, modulator 760 can generate a red or blue light field that can be changed to s-polarized light by filter 747, which is configured to operate as an s-polarizer. Thus, filter 746 can filter light having a polarization that is perpendicular to light exiting filter 747. Similarly, in this example, the green s-polarized light can pass through filter 726, which is configured as an s-oriented cleanup polarizer, to modulator 750. Modulator 750 can generate a green light field having s-polarized light that then passes through filter 727, which is a p-polarizer. Thus, the green light field can enter the cube as p-polarized light. Note that filter 726 can filter light having a polarization that is perpendicular to light exiting filter 727. In other embodiments, filters 726 and 746 can filter light having a polarization that is parallel to light exiting filters 727 and 747.

As illustrated in FIG. 7B, during a second temporal field, the yellow filter is disposed in the optical path so that a second illuminant 719 of yellow light may be supplied to mirror 721, which reflects the yellow light towards dichroic mirror 723. Dichroic mirror 723 then can separate the yellow illuminant into a second subset of colors including primary colors 734 and 736. As previously described in FIG. 7A, dichroic mirror 723 can reflect primary color 734 as green light towards mirror 725, which can reflect the green light towards filter 726. Then, the green light can pass through filter 726, and can be modulated by rear modulator 750 to produce a green sub-image 739. Green sub-image 739 can be of low resolution, according to some embodiments, and can then pass through filter 727, enter PBS 752, pass through surface 754, and illuminate front modulator 770. In some embodiments, filter 727 is configured to produce p-polarized light for green sub-image 739.

Contemporaneously (or substantially contemporaneously) during the second temporal field, dichroic mirror 723 is configured to transmit primary color 736 as red light towards mirror 745, which can direct the red light towards filter 746 of FIG. 7A. Rear modulator 760 is configured to modulate the red light to produce a red sub-image 737 being a red-colored low resolution version of the input image, as coordinated by the illuminant synchronizer and hybrid synthesis controller. In some embodiments, filter 747 (e.g., similar to filter 747 of FIG. 7A) is configured to produce s-polarized light for red sub-image 737. For example, filter 747 can be configured to filter light for primary color 736 to produce s-polarized, red light field 737. The red sub-image then can enter PBS 752 as s-polarized light, and then be reflected from birefringent surface 754 to illuminate front modulator 770. Accordingly, during a second temporal field, a subset of sub-images represented by primary color light fields 739 and 737 can be superimposed upon modulator 770.

During the first temporal field, front modulator 770 is configured to modulate the green and blue low resolution superimposed sub-images with a high resolution sub-image associated with data derived from the input image, as coordinated by the illuminant synchronizer and the hybrid synthesis controller, to illuminate green and magenta sub-pixels of filter 772, thereby producing a first output sub-image 782 having cyan (green+blue) color. During the second temporal field, front modulator 770 is configured to modulate the green and red low resolution superimposed sub-images with a high resolution sub-image associated with data received from the input image to illuminate the green and magenta sub-pixels of filter 772, thereby producing a second output sub-image 784 having yellow (green+red) color. Over both first and second temporal fields, hybrid color synthesis is achieved: first with the temporal color synthesis by imaging the first and second output sub-images 782 and 784 sequentially and successively over two temporal fields at front modulator 770; and second with the spatial three dimensional color synthesis of sub-images 782 and 784 with a high resolution sub-image and filter 772 at modulator 770 to thereby produce a projectable image with high dynamic range contrast ratio that can be configured to be projected with lens assembly 774.

High dynamic range projection systems of FIGS. 7A and 7B can be implemented using any other color combination of backlight fields and color filters (e.g., in pixel mosaics), according to various embodiments. Examples of such combinations are depicted in FIGS. 11 and 12. In some embodiments, modulator 770 is implemented as a reflective-type modulator similar to, for example, modulator 570a of FIG. 5C. In still yet other embodiments, high dynamic range projection systems of FIGS. 7A-7B can be configured to include an additional modulator 770' and an additional filter 772' (not shown) that are configured to cooperate with modulator 770 and filter 772 to generate high resolution projectable images. For example, modulators 770 and 770' and filters 772 and 772' can be arranged to operate similar to components 170 and 170' and components 171 and 171' of FIG. 1. In alternate embodiments, rear modulators 750 and 760 can be configured to provide high resolution sub-images (e.g., similar resolutions as modulator 770). In some embodiments, front modulators 770 and 770' are configured to share filter 772, which is positioned in suitable locations in, for example, spectral-optical assembly 713.

Figure 8A:
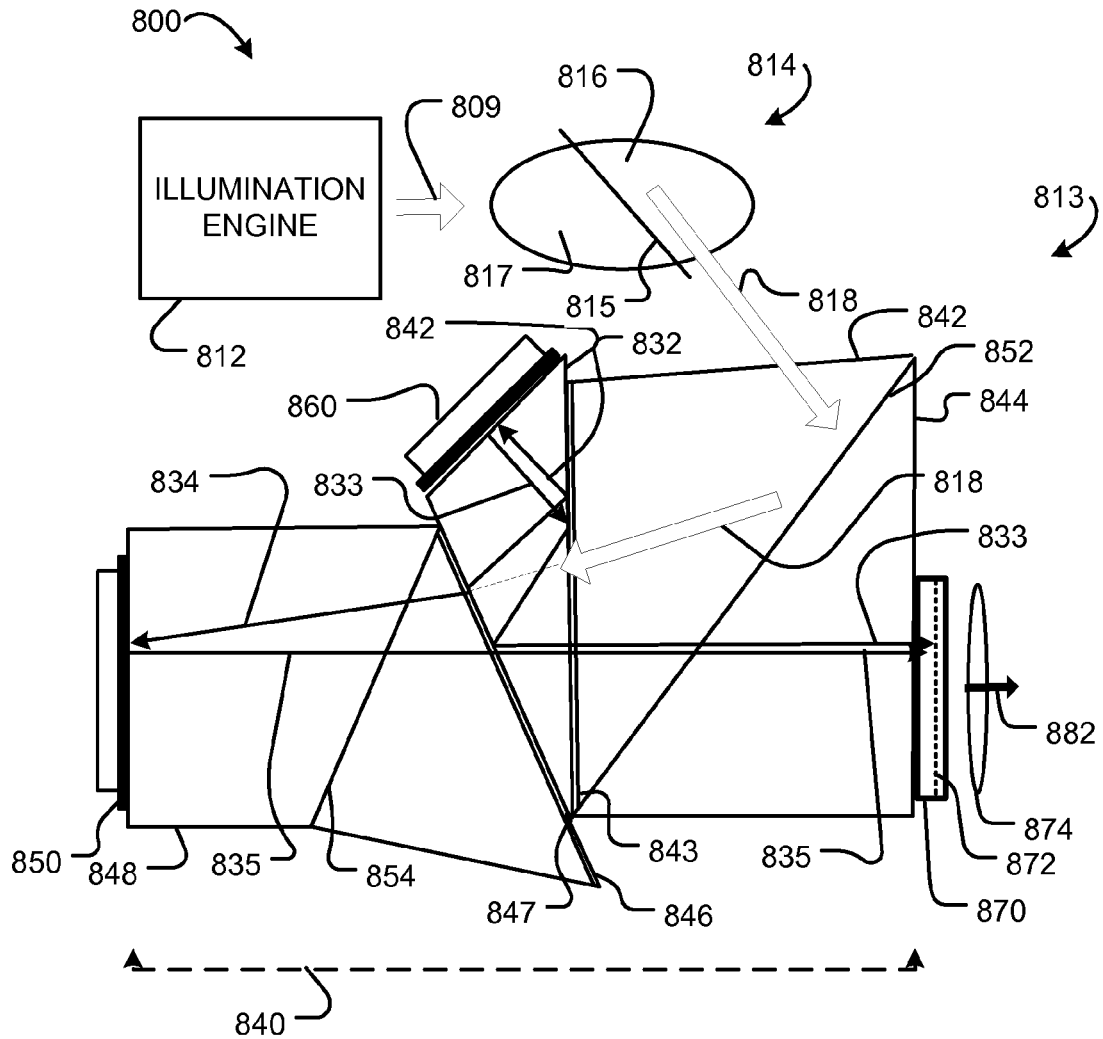
FIGS. 8A-8B illustrate still further examples of a high dynamic range projection system, according to at least some embodiments of the invention.
Figure 8B:
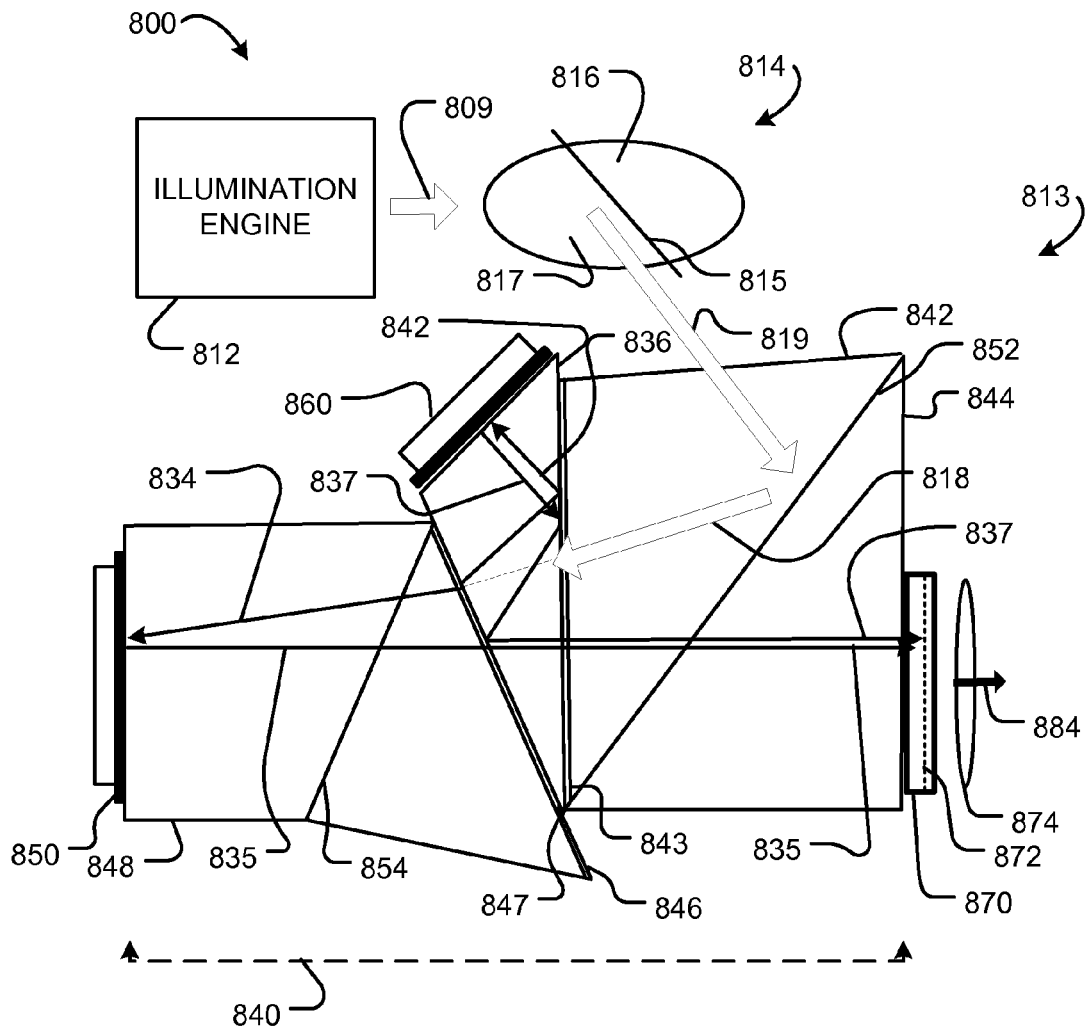

FIGS. 8A-8B illustrate still further examples of a high dynamic range projection system, according to at least some embodiments of the invention. In some embodiments, an HDR projection system is used with digital micromirror devices ("DMD") in which rear modulators is of low resolution. In some embodiments, the rear modulators are implemented using reflective or transmissive technologies, such as LCoS or LCD technologies. The HDR projection system can also include one or more front modulators are of higher resolution. In some embodiments, the rear and front modulators are of the same or equivalent resolution with each other. In FIG. 8A, projection system 800 can include an illumination engine 812, a spectral-optical assembly 813, a rear modulator 850, a rear modulator 860, a front modulator 870 with filter 872 and a projection lens assembly 874. Illumination engine 812 can be similar in function to illumination engines 512, 612 and 712, as previously described, and can supply a white light (or light spectrum) 809 along an optical path and incident on the temporal color separator 814.

Spectral-optical assembly 813 can include a temporal color separator 814, and a total internal reflection (TIR) prism assembly 840. In some examples, temporal color separator 814 may be a color wheel with divider 815, where a first color filter 816 is configured to emit cyan light and a second color filter 817 is configured to emit yellow light. The cyan and yellow color filters may be sequentially positioned along the optical path as a function of time, as determined by the rotating color wheel, as previously described in FIGS. 5A-5B to 7A-7B. In such examples, TIR prism assembly 840 may include a TIR prism 842, coupled to color prisms 844, 846 and 848. TIR prism assembly 840 can include a surface 843 that is configured to receive illumination as light incident at an angle. Surface 843 can allow light to pass through, and yet cause total internal reflection when light is in the imaging path of the prism. In these examples, color prisms 844, 846 and 848 are configured to allow light to travel along an optical path. Prism 846 may include a dichroic surface 847 that may be a thin film color filter to selectively pass light of a certain wavelength (i.e., corresponding to a certain range of colors) and to reflect light of other wavelengths (i.e., corresponding to other colors). Note that the filtration response of the dichroic surface 847 may be dependent upon the incidence angle of incoming light field. In other examples, TIR prism assembly 840 may be implemented using one or more color prisms with a TIR prism, such as a type of TIR prism produced by 3M®.

In some examples, rear modulators 850 and 860 may each be a digital micromirror device (DMD) modulator configured to produce a sub-image that is a low resolution version of the input image. In other embodiments, rear modulators 850 and 860 are configured to generate sub-images that are of high resolution (e.g., with similar resolution to front modulator 870). High dynamic range projection systems of FIGS. 8A and 8B can be implemented using any other color combination of backlight fields and color filters (e.g., in pixel mosaics), according to various embodiments. Examples of such combinations are depicted in FIGS. 11 and 12. In other examples, DMD modulators may be those manufactured by Texas Instruments®. Front modulator 870 may be a transmissive LCD-type modulator, and filter 872 may have a plurality of green-magenta sub-pixels, by way of further examples. In embodiments in which LCoSS, LCD or equivalent technologies are used to implement rear modulators 850 and 860, light 809 can be polarized light in directions suitable for HDR projection system 800. Further, polarizing filters (not shown) are implemented for each rear modulator. In some embodiments, front modulator 870 is implemented using a DMD device in combination with one or more arrays of color elements. In one embodiment, the HDR projection system of FIGS. 8A and 8B can be configured to implement multiple front modulators and multiple arrays of color filters similar or equivalent to the arrangement depicted in FIG. 1 as components 170 and 170' and components 171 and 171'. For example, two additional DMD devices can be used in conjunction with, for example, a DMD configured as one of the front modulators. In some embodiments, front modulators 870 and 870' (not shown) are configured to share filter 872, which is positioned in suitable locations in, for example, spectral-optical assembly 813.

As illustrated in FIG. 8A, a cyan filter is disposed in the optical path during a first temporal field so that a first illuminant 818 of cyan light may be supplied to TIR prism assembly 840. The first illuminant 818 can be received by TIR prism 842, and can reflect from interface 852 to pass through surface 843 and impinge upon dichroic surface 847. Dichroic surface 847 then can separate the cyan illuminant into a first subset of colors including the primary colors 832 and 834. Dichroic surface 847 then can allow transmission of primary color 834 as green light through surface 854 to illuminate rear modulator 850. Rear modulator 850 can be configured to modulate the green light to produce a green sub-image being a green-colored low resolution version of the input image, as coordinated by the illuminant synchronizer and hybrid synthesis controller. Modulator 850 can reflect the green sub-image to produce light field 835, which can pass through surfaces 854, 847, 843 and 852 to illuminate front modulator 870.

Contemporaneously (or substantially contemporaneously) during the first temporal field, dichroic surface 847 can cause total internal reflection of primary color 832 being blue light to be reflected by surface 843 to illuminate rear modulator 860. Rear modulator 860 can be configured to modulate the blue light to produce a blue sub-image being a blue-colored low resolution version of the input image, as coordinated by the illuminant synchronizer and hybrid synthesis controller. Modulator 860 can reflect the blue sub-image to produce light field 833 that undergoes a total internal reflection against surfaces 843 and 847. Color light field 833 can then be directed along the optical path through interface 852 to illuminate front modulator 870. Accordingly, during a first temporal field, a subset of sub-images represented by primary color light fields 833 and 835 can be superimposed upon modulator 870.

As illustrated in FIG. 8B, a yellow filter can be disposed in the optical path during a second temporal field so that a second illuminant 819 of yellow light may be supplied to TIR prism assembly 840. The second illuminant 819 can enter TIR prism 842, and can reflected from interface 852 to pass through surface 843, and impinge upon dichroic surface 847. Dichroic surface 847 then can separate the yellow illuminant into a second subset of colors including primary colors 834 and 836. Dichroic surface 847 can allow transmission of primary color 834 as green light through interface 854 to illuminate rear modulator 850. Rear modulator 850 can be configured to modulate the green light to produce a green sub-image, represented by light field 835, which can be reflected to travel across interface 854, surfaces 847 and 843, and interface 852 to illuminate front modulator 870.

Contemporaneously (or substantially contemporaneously) during the second temporal field, dichroic surface 847 can be configured to cause a total internal reflection of primary color 836 as red light to be reflected by surface 843 to illuminate rear modulator 860. Rear modulator 860 can be configured to modulate the red light to produce a red sub-image being a red-colored low resolution version of the input image, as coordinated by the illuminant synchronizer and hybrid synthesis controller. Modulator 860 can reflect the red sub-image to produce light field 837, which can undergo a total internal reflection against surfaces 843 and 847 to be directed through interface 852 along the optical path to illuminate front modulator 870. Accordingly, during a second temporal field, a subset of sub-images represented by primary color light fields 835 and 837 can be superimposed upon modulator 870.

During the first temporal field, front modulator 870 can be configured to modulate the green and blue low resolution superimposed sub-images with a high resolution sub-image associated with data derived from the input image, as coordinated by the illuminant synchronizer and the hybrid synthesis controller, to illuminate green and magenta sub-pixels of filter 872, thereby producing a first output sub-image 882 having cyan (green+blue) color. During the second temporal field, front modulator 870 can be configured to modulate the green and red low resolution superimposed sub-images with a high resolution sub-image associated with data received from the input image to illuminate the green and magenta sub-pixels of filter 872, thereby producing a second output sub-image 884 having yellow (green+red) color. Over both first and second temporal fields, hybrid color synthesis can be achieved: first with the temporal color synthesis by imaging the first and second output sub-images 882 and 884 sequentially and successively over two temporal fields at front modulator 870; and second with the spatial three-dimensional color synthesis of sub-images 882 and 884 with a high resolution sub-image and filter 872 at modulator 870 to thereby produce a projectable image with high dynamic range contrast ratio that can be configured to be projected with lens assembly 874. High dynamic range projection systems of FIGS. 8A and 8B can be implemented using any other color combinations of backlight fields and color filters (e.g., in pixel mosaics), according to various embodiments. Examples of such combinations are depicted in FIGS. 11 and 12.

Figure 9:
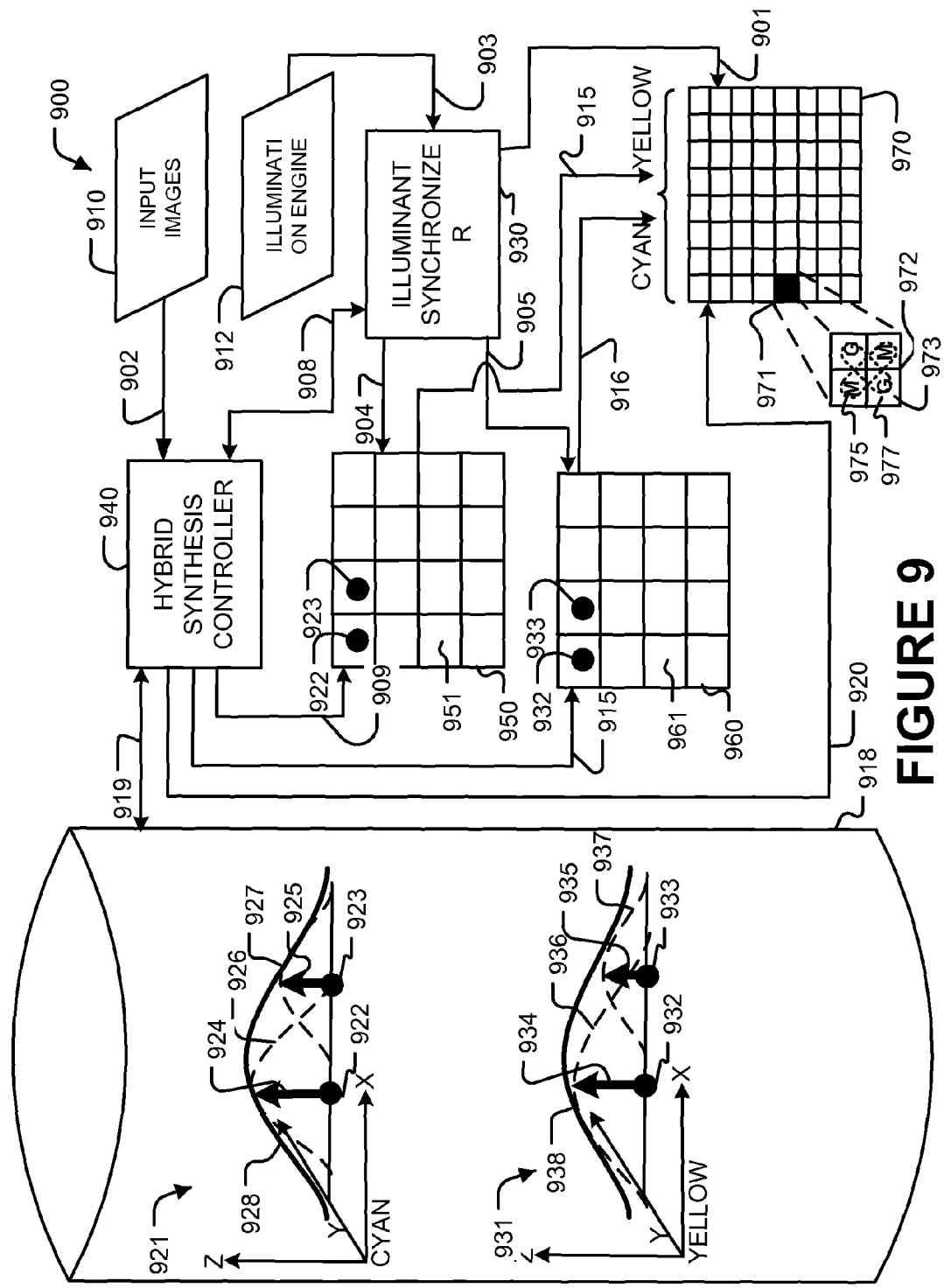
FIG. 9 illustrates another functional block diagram representing an example of operating a high dynamic range projection system, according to at least some embodiments of the invention.

FIG. 9 illustrates another functional block diagram representing an example of operating a high dynamic range projection system, according to at least some embodiments of the invention. Note that certain features of FIG. 9 can be similar to those features described in FIGS. 2A-2B. In FIG. 9, however, two illuminants (e.g., cyan and yellow) may be applied to a pair of rear modulators in accordance with spectral-optical components designed to transmit such illuminants along an optical path, and without separation into primary color components, as described in FIGS. 2A-2B. Additionally, the functions of FIG. 9 may be performed over one frame, with or without temporal color separation. Here, in FIG. 9, projection system 900 can include an illuminant synchronizer 930 configured to receive via path 903 light spectrum from illumination engine 912, a hybrid synthesis controller 940 coupled via path 908 to illuminant synchronizer 930, a hybrid synthesis controller 940 being configured to receive via path 902 input images 910, a rear modulator 950, a rear modulator 960, a front modulator 970, and a database 918. Rear modulator 950 can be coupled via path 909 to hybrid synthesis controller 940, and can include a group of modulating elements 951. Rear modulator 950 can be further coupled via path 904 to illuminant synchronizer 930. Rear modulator 960 can be coupled via path 915 to hybrid synthesis controller 940 and can include a group of modulating elements 961. Rear modulator 960 can be further coupled via path 905 to illuminant synchronizer 930. Database 918 can be coupled via path 919 to hybrid synthesis controller 940, which, in turn, can be coupled via path 920 to front modulator 970. Front modulator 970 can be coupled via path 901 to illuminant synchronizer 930.

Two rear modulators 950 and 960 can be configured to produce a subset of low resolution sub-images that can be directed to illuminate front modulator 970 via paths 915 and 916, respectively. That subset can include first low resolution sub-portions 922 and 923 illuminated with a first illuminant, and second low resolution sub-portions 932 and 933 illuminated with a second illuminant. Front modulator 970 can include a plurality of pixels 971, and can include a filter with a plurality of color elements 972 that can correspond, for example, to sub-pixels 973. Color element 972 can include a first sub-pixel element 975 and second sub-pixel element 977, both of which can provide color control in some examples. In other examples, each of the 4 sub-pixels 973 can be individually controlled to provide color control of pixel 971. Note that although magenta (M) and green (G) are shown for sub-pixels 975 and 977, respectively, other pairs of colors for color element 972 are possible, as indicated in the first column of the table of FIG. 12.

In some examples, rear modulator 950 and rear modulator 960 of FIG. 9, respectively, may be modulated in accordance with data representing a subset of low resolution sub-images, including portions 922 and 923 of a first low resolution sub-image, and portions 932 and 933 of a second low resolution sub-image. With a first illuminant being composed of cyan light, portions 922 and 923 of cyan-colored low resolution sub-image can correspond to spatially distributed luminance intensities in graph 921, the values of the luminance intensities being stored in database 918. Portions 922 and 923 can be respectively represented by luminance impulses 924 and 925, whereby a corresponding point spread function can spatially distribute the luminance intensity to respectively produce distributions 926 and 927 at the respective modulating elements 951. The spatial distribution of luminance intensities 926 and 927 may be combined to form a cyan-colored light pattern having luminance intensity distribution 928. With a second illuminant being composed of yellow light, portions 932 and 933 of a yellow-colored low resolution sub-image can correspond to spatially distributed luminance intensities in graph 931, the values of the luminance intensities being stored in database 918. Portions 932 and 933 can be respectively represented by luminance impulses 934 and 935, whereby a corresponding point spread function can spatially distribute the luminance intensity to respectively produce distributions 936 and 937 at the respective modulating element 961. The spatial distribution of luminance intensities 936 and 937 may be combined to form a yellow-colored light pattern having luminance intensity distribution 938. In a frame, cyan and yellow sub-images may be superimposed at and illuminate front modulator 970. Front modulator 970 may modulate a high resolution sub-image with the superimposed sub-images, and enable filtering through color element 972 to produce a projectable image.

In some examples, the set of low resolution sub-images of rear modulators 950 and 960 may be optically blurred by introducing a physical offset to the rear modulators 950 and 960 at the focal plane of the projection system 900. A resolution mismatch between rear modulators 950, 960 and front modulator 970 in combination with the slight blurring of the low resolution images may remove any disturbing artifacts such as moire patterns. In other examples, various imaging techniques may be used to accommodate a mismatch in resolutions between the rear modulators 950, 960 and the front modulator 970, including those that may account for the optical degree of blur as expressed in corresponding pixels (or sub-pixels) associated with the higher resolution front modulator.

Note that a low luminance difference between cyan and yellow illuminants may improve artifact mitigation, by avoiding flicker. Additionally, the use of two illuminants that have a luminance difference that can be minimized, may result in smoother projectable images (i.e., projectable images with smoother luminance intensity distribution), as opposed to projectable images based on the magnitude of luminance difference between a brightest channel (e.g., green) and a dimmest channel (e.g., blue) of the three primary color space (i.e., RGB).

Figure 10A:
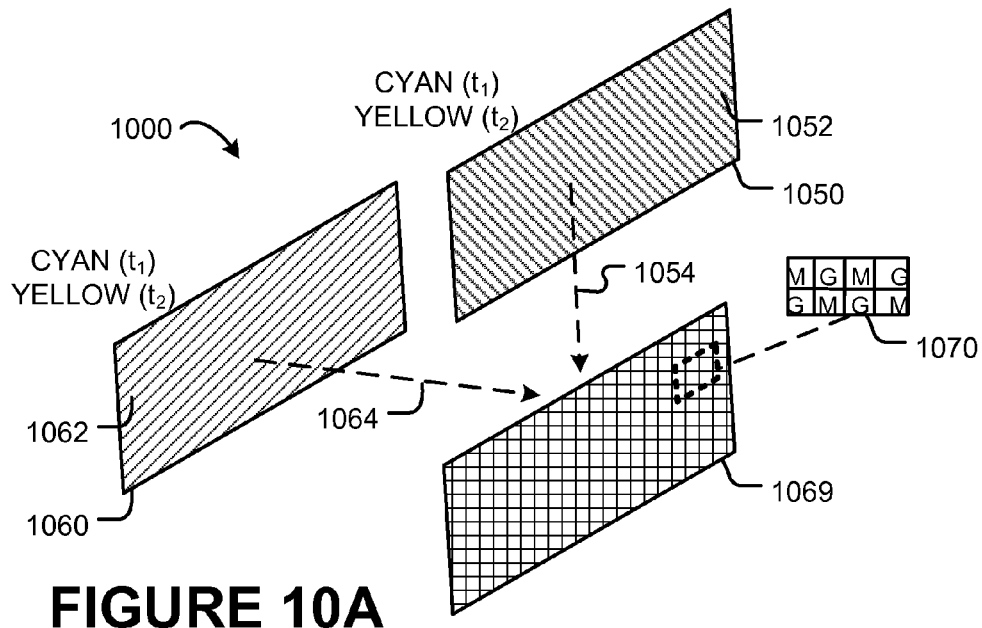
FIGS. 10A-10C illustrate exploded perspective views of two rear modulators and a front modulator with examples of hybrid color synthesis, according to at least some embodiments of the invention.
Figure 10B:
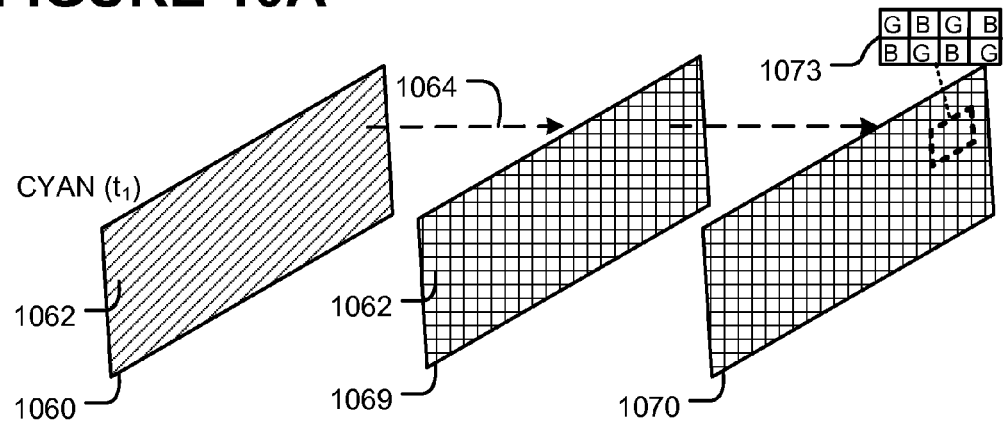
Figure 10C:
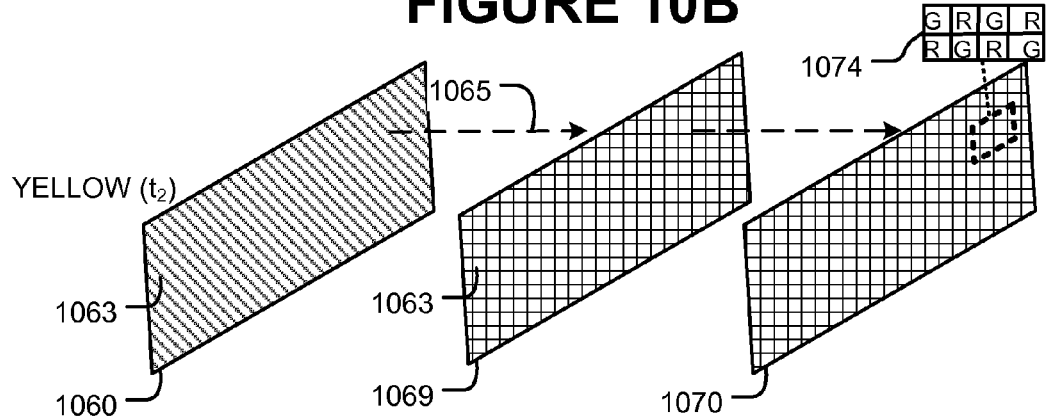

FIGS. 10A-10C illustrate exploded perspective views of two rear modulators and a front modulator with examples of hybrid color synthesis, according to at least some embodiments of the invention. Here, FIG. 10A illustrates examples of the illuminants for rear modulators 1050 and 1060, which may be supplied with two full field time varying uniform illuminants. In some examples, the illuminant may be a cyan illuminant 1062 in one temporal field (e.g., $t_1$), and a yellow illuminant 1052 in another temporal field (e.g., $t_2$). The front modulator 1069, in these examples, may include a spatial filter 1070 of magenta and green sub-pixel elements.

FIGS. 10B-10C illustrate the three dimensional color synthesis techniques for rear modulator 1060, according to some embodiments. Note that similar techniques can be applicable to rear modulator 1050. In FIG. 10B, a cyan illuminant 1062 can be supplied during a first temporal field ($t_1$) such that rear modulator 1060 can emit a light field 1064 incident on front modulator 1069 as shown in FIG. 10B, which, in turn, may selectively allow individually controlled portions of light field 1064 to be transmitted through filter 1070. In these examples, front modulator 1069 can be configured to transmit blue (i.e., cyan filtered through magenta) and green (i.e., cyan filtered through green) colors through the filter 1070, enabling blue and green color information 1073 to be represented in the output image. The blue and green color information 1073 may be perceived by a human visual system as cyan because of spatial color synthesis occurring at filter 1070.

In FIG. 10C, a yellow illuminant 1063 can be supplied during the next temporal field ($t_2$), and rear modulator 1060 can emit a light field 1065 incident on front modulator 1069, which, in turn, may selectively allow individually controlled portions or all of the light field 1065 to be transmitted through filter 1070. In these examples, front modulator 1069 can be configured to transmit red (i.e., yellow filtered through magenta) and green (i.e., yellow filtered through green) colors through filter 1070, enabling red and green color information 1074 to be represented in the output image. The red and green color information 1074 may be perceived by a human visual system as yellow because of spatial color synthesis occurring at filter 1070.

Additionally, three dimensional color synthesis may be achieved across spatial and temporal domains from the combination of magenta and green sub-pixel elements in filter 1070 receiving modulated low resolution superimposed sub-images of cyan illuminant during a first temporal field and modulated low resolution superimposed sub-images of yellow illuminant during a second temporal field. FIG. 12 illustrates a table of exemplary three dimensional color synthesis combinations, by way of examples.

Reference to the term birefringence can refer to a certain medium wherein the index of refraction of light is dependent upon its state of polarization, according to some embodiments. Birefringent surfaces can have different reflectance/transmission ratios dependent upon, for example, a wavelength and a SOP of incident light.

Reference to a high dynamic range can describe images and imaging systems that can display very high brightness (luminance) ratios between light and dark features, according to some embodiments.

Reference to liquid crystal on silicon (LCoS) can refer to a reflective optical component that can accept linearly polarized incident light, and reflect light with the reflected beam of light having an altered SOP of between 0 and 90 degrees (relative to the incident beam) on a pixel-by-pixel basis (or on a sub-pixel by sub-pixel basis).

Reference to liquid crystal display can refer to a transmissive optical component that can change the state of polarization of incident light (e.g., on a pixel-by-pixel basis) between 0 and 90 degrees and transmits the light with the altered characteristics, according to some embodiments.

Reference to the terms "direct light" can refer to reflected light and/or transmitted light, according to some embodiments.

Reference to an f-number, also known as focal ratio or relative aperture in optics, of an optical system, can express the diameter of the entrance pupil in terms of the focal length of the lens, according to some embodiments. In some examples, the f-number is the focal length divided by the "effective" aperture diameter, according to some embodiments.

Note that as the field rate approaches 120 Hz from 60 Hz to operate the projection systems, computer-readable media, methods, integrated circuits, and apparatuses described herein, artifact mitigation, flicker and color breakup can be improved.

Reference made to a contrast ratio herein may refer to a ratio determined by the luminance resulting from full-on and full-off modulator signals.

The described method, techniques, processes, apparatuses, computer-media and systems described herein may be applicable to a variety of applications. In some examples, one or more embodiments may be implemented in a device that is configured to display an image with motion (e.g., video), images without motion, pictorial images, and/or text. In other examples, one or more embodiments may be implemented with devices, such as, but not limited to, appliances, architectural structures, aesthetic art work, audio-visual devices, calculators, camcorders, camera displays, clocks, computer monitors, digital modulator projection systems, data projectors, digital cinema, digital clocks, electronic photographs, electronic billboards, electronic devices, electronic signs, game console and peripheral devices, graphic arts, high dynamic range (HDR) displays, home theater systems and media devices, flat panel displays, global positioning sensors (GPS) and navigators, handheld computers, large displays, medical devices, medical imaging devices or systems, MP3 players, mobile telephones, packaging, personal digital assistants (PDAs), portable computers, portable projectors, projection systems, stereoscopic displays, surveillance monitors, televisions, television displays, vehicle-related control and/or monitoring displays (e.g., cockpit displays, windshield display, dashboard display, motorcycle helmet visor display, vehicular rear view camera displays etc. . . . ), watches, and wireless devices.

In some embodiments, the functions and/or sub-processes may be performed by any structure described herein.

In some examples, the methods, techniques and processes described herein may be performed and/or executed by software instructions on computer processors. For example, one or more processors in a computer or other display controller may implement the methods of FIGS. 1, 2A-2B, 4A-4B, and 9-10C, by executing software instructions in a program memory (e.g., storage/memory 322 of FIG. 3) accessible to a processor. Additionally, the methods, techniques and processes described herein may be performed with full frame images using a graphics processing unit (GPU) or a control computer, or field-programmable gate array (FPGA) coupled to the display. These methods, techniques and processes may also be provided in the form of a program product, which may comprise any medium and/or media which carries a set of computer-readable instructions which, when executed by a data processor, cause the data processor to execute such methods, techniques and/or processes. Program products, may include, but are not limited to: physical media such as magnetic data storage media, including floppy diskettes, and hard disk drives; optical data storage media including CD ROMs, and DVDs; electronic data storage media, including ROMs, flash RAM, non-volatile memories, thumb-drives, or the like; and transmission-type media, such as digital or analog communication links, virtual memory, hosted storage over a network or global computer network, and networked-servers.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, Ruby on Rails, and others. These can be varied and are not limited to the examples or descriptions provided.

Various embodiments or examples of the invention may be implemented in numerous ways, including as a system, a process, an apparatus, or a series of program instructions on a computer readable media and/or computer readable medium such as a computer readable storage media or a computer network where the program instructions are sent over optical, electronic, or wireless communication links. In general, operations of disclosed processes may be performed in an arbitrary order, unless otherwise provided in the claims.

A detailed description of one or more examples is provided herein along with accompanying figures. The detailed description is provided in connection with such examples, but is not limited to any particular example. The scope is limited only by the claims, and numerous alternatives, modifications, and equivalents are encompassed. Numerous specific details are set forth in the description in order to provide a thorough understanding. These details are provided as examples and the described techniques may be practiced according to the claims without some or all of the accompanying details. They are not intended to be exhaustive or to limit the invention to the precise forms disclosed, as many alternatives, modifications, equivalents, and variations are possible in view of the above teachings. For clarity, technical material that is known in the technical fields related to the examples has not been described in detail to avoid unnecessarily obscuring the description.

The description, for purposes of explanation, uses specific nomenclature to provide a thorough understanding of the invention. However, it will be apparent that specific details are not required in order to practice the invention. In fact, this description should not be read to limit any feature or aspect of the present invention to any embodiment; rather, features and aspects of one example can readily be interchanged with other examples. Notably, not every benefit described herein need be realized by each example of the present invention; rather, any specific example may provide one or more of the advantages discussed above. In the claims, elements and/or operations do not imply any particular order of operation, unless explicitly stated in the claims. It is intended that the following claims and their equivalents define the scope of the invention.

The invention claimed is:

1. A projection system, comprising:
   two rear modulators configured to provide subsets of light patterns during intervals of time to an optical path, each of the light patterns representing a low resolution version of an input image with a subset of ranges of wavelengths in a visible light spectrum; and
   a front modulator disposed on the optical path, the front modulator comprising:
   a plurality of pixels each being configured to modify one or more of the ranges of wavelengths for portions of the light patterns using superposition along the optical path, and to modify a value of luminance for the portions of the light patterns based on the input image,
   wherein the front modulator is configured to generate a projectable image having a resolution greater than the light patterns, with wavelengths in the visible light spectrum.

2. The projection system of claim 1, wherein the subsets of light patterns are generated based on first and second illuminants.

3. The projection system of claim 2, wherein the first and second illuminants are respectively selected as a color pair from a group comprising blue-yellow, cyan-yellow, green-magenta, cyan-magenta, red-cyan, and magenta-yellow.

4. The projection system of claim 1, further comprising:
   a temporal color separator configured to generate at one end of the optical path a first illuminant and a second illuminant using a light spectrum received from a light source.

5. The projection system of claim 1, further comprising:
   a spectral-optical assembly configured to define the optical path, wherein a portion of the spectral-optical assembly is disposed between the two rear modulators and the front modulator.

6. The projection system of claim 1, wherein the subsets of light patterns comprise:
   a first subset of light patterns being provided along the optical path during a first temporal field using a first illuminant; and
   a second subset of light patterns being provided along the optical path during a second temporal field using a second illuminant,
   wherein the two rear modulators are configured to alternately apply the first subset of light patterns and the second subset of light patterns to the front modulator to facilitate temporal color synthesis.

7. The projection system of claim 1, wherein the front modulator further comprises: an array of color elements configured to receive the portions of the light patterns and to modify one or more of the ranges of the wavelengths in the visible light spectrum during a first temporal field and a second temporal field, respectively, to form the projectable image.

8. The projection system of claim 7, wherein each of the color elements comprises:
   a two sub-pixel element.

9. The projection system of claim 8, wherein the two sub-pixel element comprises:
   a first subset of sub-pixel color filters; and
   a second subset of sub-pixel color filters.

10. The projection system of claim 9, wherein each of the plurality of pixels comprises:
    a first subset of sub-pixels configurable to transmit the portions of the light patterns through the first subset of sub-pixel color filters; and
    a second subset of sub-pixels configurable to transmit the portions of the light patterns through the second subset of sub-pixel color filters,
    wherein each sub-pixel of the first subset of sub-pixels and the second subset of sub-pixels is individually controllable.

11. The projection system of claim 1, wherein the two rear modulators comprise:
    a first rear modulator comprising:
    modulating elements configured to receive a first range of the wavelengths in the visible light spectrum during a first temporal field to generate a first light pattern, and to receive a second range of the wavelengths in the visible light spectrum during a second temporal field to generate a second light pattern; and
    a second rear modulator comprising:
    modulating elements configured to receive at least a third range of the wavelengths in the visible light spectrum during the first temporal field and the second temporal field to generate a third light pattern,
    wherein a quantity of the modulating elements is fewer than a quantity of the pixels.

12. The projection system of claim 11, further comprising:
    a controller configured to predict a first luminance value for a pixel during the first temporal field, the first luminance value being based on a first combined luminance value for portions of the first light pattern and the third light pattern associated with the pixel, and to predict a second luminance value for the pixel during the second temporal field, the second luminance value being based on a second combined luminance value for portions of the second light pattern and the third light pattern associated with the pixel,
    the controller further configured to scale pixel data from the input image for the pixel by the first combined luminance value and by the second combined luminance value during the first temporal field and the second temporal field, respectively.

13. The projection system of claim 1, further comprising:
a synchronizer configured to cause generation of first and second illuminants to illuminate the two rear modulators during respective first and second intervals of time, the synchronizer being adapted to cooperate with the front modulator to enable temporal color synthesis of the subsets of light patterns.

14. A projection system, comprising:
two rear modulators configured to produce first and second subsets of light patterns, each subset representing low resolution versions of an input image, the first subset of light patterns having a first spectral power distribution, the second subset of light patterns having a second spectral power distribution, wherein a luminance difference between the first and second spectral power distributions is less than a luminance difference between a brightest channel and a dimmest channel of three primary colors;
a front modulator having a plurality of pixels and a filter; and
a controller configured to selectively activate the two rear modulators to direct the first and second subsets of light patterns to illuminate the front modulator during respectively first and second temporal fields so as to produce a set of temporally synthesized images,
wherein the controller is further configured to cause the front modulator to generate a projectable image by spatially synthesizing the set of temporally synthesized images with a high resolution light pattern and the filter over the first and second temporal fields.

15. The projection system of claim 14, wherein the controller is further configured to cause the front modulator to adjust transmissivity of the plurality of pixels to enable a selectable amount of the first and second subsets of light patterns to be transmitted through the filter to form the projectable image.

16. The projection system of claim 15, wherein the filter comprises a plurality of two sub-pixel elements selected from color pairs comprising magenta-green, cyan-magenta, cyan-yellow, blue-yellow, magenta-yellow, and red-cyan.

17. The projection system of claim 14, further comprising:
a temporal color separator configured to supply first and second illuminants with respectively the first and second spectral power distributions to illuminate the two rear modulators, the first and second illuminants being derived from a light spectrum received from an illumination engine.

18. A projection system, comprising:
two rear modulators configured to produce first and second subsets of sub-images having a first contrast ratio and representing low resolution versions of an input image; and,
a front modulator adapted to be illuminated by the first and second subsets of sub-images so as to produce a temporally synthesized set of images, and configured to produce a high resolution sub-image derived from the input image and having a second contrast ratio, the front modulator being operative to form a projectable image from spatial color synthesis of the temporally synthesized set of images with the high resolution sub-image and color elements,
wherein the projectable image includes a contrast ratio derived from a multiplicative-combination of the first contrast ratio with the second contrast ratio.

19. The projection system of claim 18, further comprising:
a temporal color separator configured to supply first and second illuminants to respectively the first and second subsets of sub-images, the first and second illuminants being derived from a light spectrum provided by an illumination engine.

20. The projection system of claim 18, further comprising:
a controller configured to cause the two rear modulators to direct the first and second subsets of sub-images to illuminate the front modulator, and configured to cause the front modulator to effectuate temporal and spatial color synthesis of the first and second subsets of sub-images with the high resolution sub-image and the color elements to form the projectable image.

21. The projection system of claim 18, wherein the two rear modulators comprise two low resolution modulators configured to direct the first and second subsets of sub-images along an optical path to illuminate the front modulator.

* * * * *